(12) United States Patent
Yamada

(10) Patent No.: US 7,406,258 B2
(45) Date of Patent: Jul. 29, 2008

(54) POP-UP FLASH OF A CAMERA

(75) Inventor: Toshiaki Yamada, Saitama (JP)

(73) Assignee: Hoya Corporation, Tokyo (JP)

( * ) Notice: Subject to any disclaimer, the term of this patent is extended or adjusted under 35 U.S.C. 154(b) by 150 days.

(21) Appl. No.: 11/052,825

(22) Filed: Feb. 9, 2005

(65) Prior Publication Data
US 2005/0175333 A1    Aug. 11, 2005

(30) Foreign Application Priority Data
Feb. 10, 2004 (JP) ............................. 2004-034028

(51) Int. Cl.
*G03B 15/05* (2006.01)
(52) U.S. Cl. ...................... 396/177; 348/371
(58) Field of Classification Search ......... 396/176–178; 348/370, 371; 362/3
See application file for complete search history.

(56) References Cited

U.S. PATENT DOCUMENTS

| | | | |
|---|---|---|---|
| 5,253,004 A | 10/1993 | Umetsu | |
| 5,329,327 A | 7/1994 | Arai | |
| 5,565,941 A * | 10/1996 | Kaneko | ...................... 396/177 |
| 5,721,984 A | 2/1998 | Kaneko et al. | |
| 5,852,752 A | 12/1998 | Nakanishi et al. | |
| 6,351,609 B1 | 2/2002 | Hosokawa et al. | |

FOREIGN PATENT DOCUMENTS

| | | | |
|---|---|---|---|
| JP | 06242497 A | * | 9/1994 |
| JP | 2001-005056 | | 1/2001 |

OTHER PUBLICATIONS

U.S. Appl. No. 11/052,763, Yamada, filed Feb. 9, 2005.

* cited by examiner

*Primary Examiner*—W. B. Perkey
*Assistant Examiner*—Rishi S Suthar
(74) *Attorney, Agent, or Firm*—Greenblum & Bernstein, P.L.C.

(57) ABSTRACT

A pop-up flash of a camera includes a flash unit movable between a retracted position, in which the flash unit is accommodated in a camera body, and a fully-lifted position, in which the flash unit projects from the camera body; a biasing device which biases the flash unit toward the fully-lifted position; and a speed-change mechanism for changing a speed of movement of the flash unit, which is driven by the biasing force of the biasing device, during movement of the flash unit in a projecting direction from the retracted position to the fully-lifted position.

19 Claims, 17 Drawing Sheets

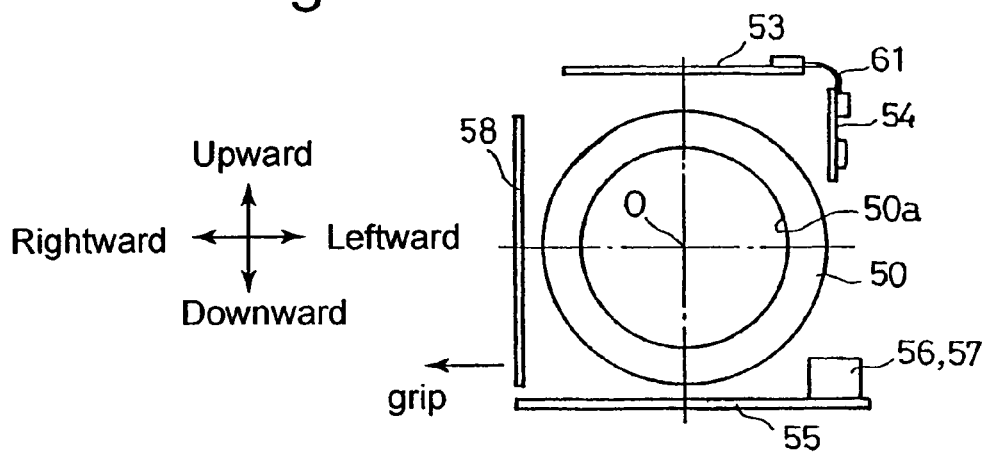
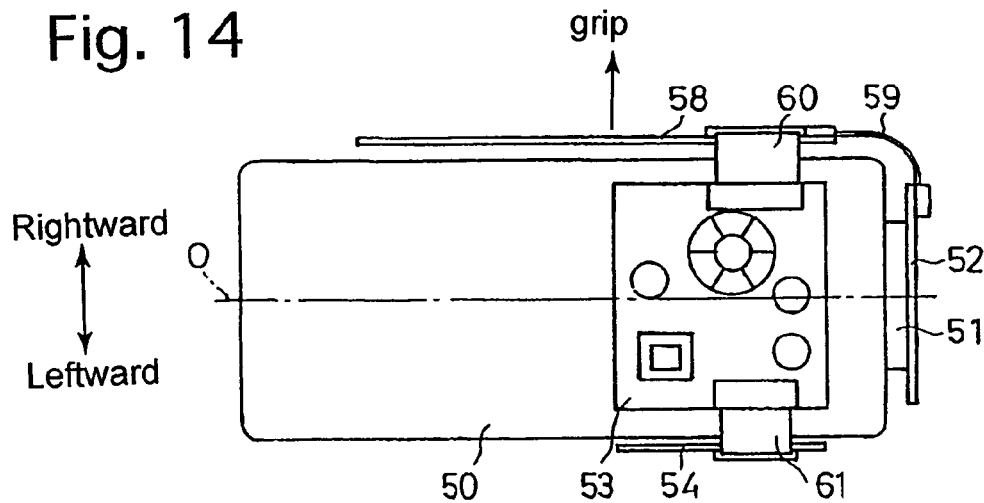

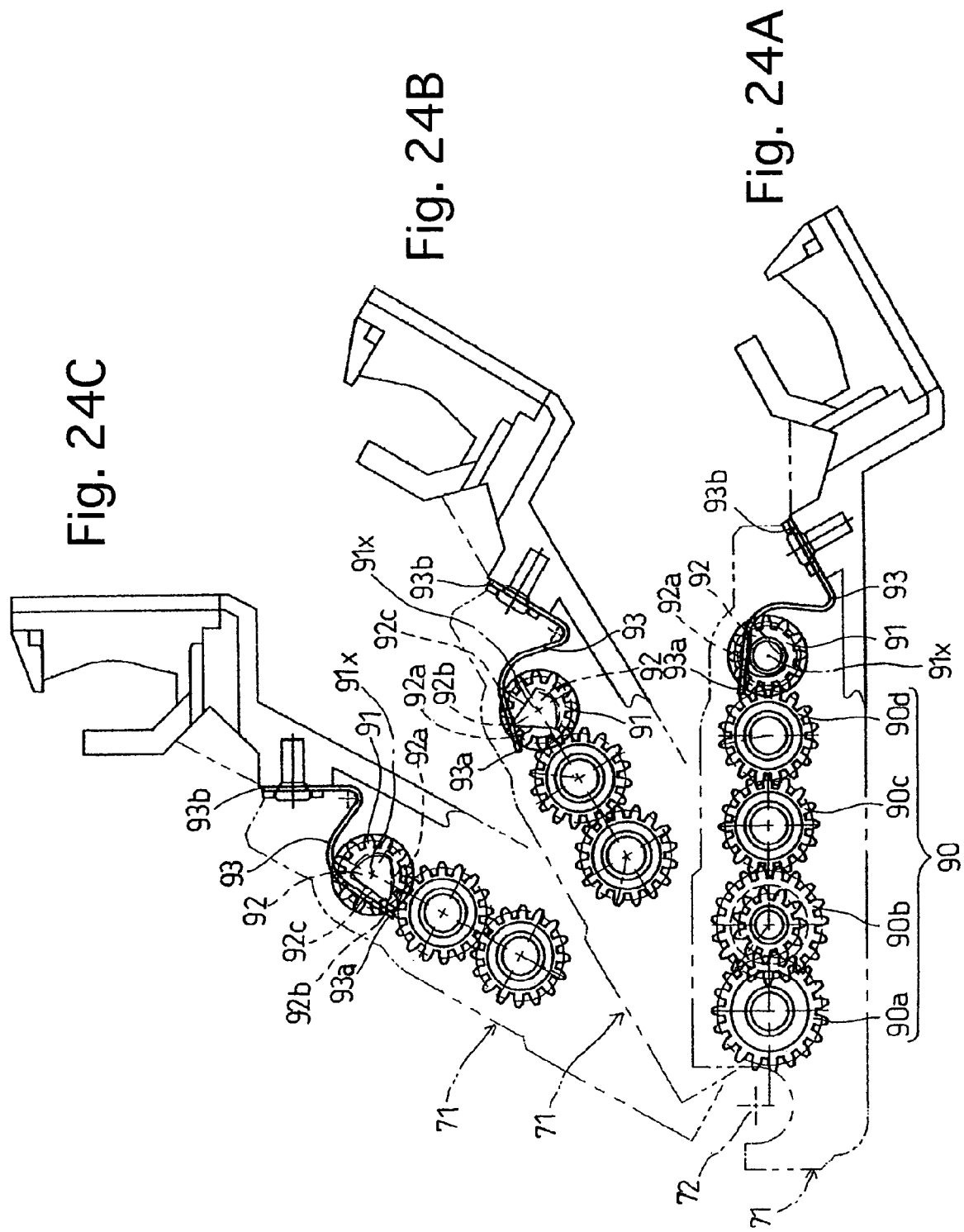

POP-UP FLASH OF A CAMERA

BACKGROUND OF THE INVENTION

1. Field of the Invention

The present invention relates to a pop-up flash of a camera which pops up out of a camera body in flash photography.

2. Description of the Related Art

Various types of cameras are equipped with a pop-up flash whose light emitting portion is movable between a retracted position, in which the light emitting portion is retracted into a camera body, and a fully-lifted position, in which the light emitting portion projects from the camera body. It is generally the case that the light emitting portion of the pop-up flash is continuously biased toward the fully-lifted position (i.e., in a projecting direction) and that the light emitting portion is held in its retracted position against the biasing force by a locking mechanism. The biasing device which continuously biases the light emitting portion toward the fully-lifted position is made of a spring so that the resiliency of the spring (the torque produced by the spring) becomes maximum when the pop-up flash is held in the retracted position and gradually reduces as the light emitting portion approaches the fully-lifted position. Accordingly, the speed of movement of the light emitting portion gradually reduces in a direction toward the fully-lifted position from the retracted position as approaching the fully-lifted position.

In the pop-up flash, the light emitting portion needs to be securely moved to the fully-lifted position, and accordingly, it is required to keep the movement speed of the light emitting portion above a certain movement speed even when the light emitting portion comes near the fully-lifted position. However, the movement speed of the light emitting portion gradually reduces in a direction toward the fully-lifted position from the retracted position as approaching the fully-lifted position as described above. Conversely, the movement speed of the light emitting portion does not need to be so fast from the retracted position to an intermediate position in the projecting direction so long as the light emitting portion can be securely moved in an initial moving stage thereof from the retracted position toward the fully-lifted position.

SUMMARY OF THE INVENTION

The present invention provides a pop-up flash of a camera in which the movement speed of the light emitting portion is controlled as appropriate to ensure the movement of the light emitting portion between the retracted position and the fully-lifted position.

According to an aspect of the present invention, a pop-up flash of a camera includes a flash unit movable between a retracted position, in which the flash unit is accommodated in a camera body, and a fully-lifted position, in which the flash unit projects from the camera body; a biasing device which biases the flash unit toward the fully-lifted position; and a speed-change mechanism for changing a speed of movement of the flash unit, which is driven by the biasing force of the biasing device, during movement of the flash unit in a projecting direction from the retracted position to the fully-lifted position.

It is desirable for the speed-change mechanism to reduce the movement speed of the flash unit in a first range of movement of the flash unit from the retracted position to an intermediate position toward the fully-lifted position, and stops reducing the movement speed of the flash unit in a second range of movement of the flash unit from the intermediate position toward the fully-lifted position.

It is desirable for the speed-change mechanism to include an auxiliary biasing member which is resiliently bent by a large amount when the speed-change mechanism reduces the movement speed of the flash unit, and is released from being resiliently bent when the speed-change mechanism stops reducing the movement speed of the flash unit to give the flash unit an auxiliary biasing force which assists the flash unit in moving toward the fully-lifted position.

It is desirable for the flash unit to be pivoted about a pivot to be rotatable relative to the camera body between the retracted position and the fully-lifted position. The speed-change mechanism includes a leaf spring one end of which is fixed to the flash unit so that another end of the leaf spring serves as a free end; and a rotary driven member supported by the flash unit to be rotatable on a rotational axis which is parallel to the pivot and driven to rotate forward and reverse by forward and reverse rotations of the flash unit, respectively. The rotary driven member includes a noncircular portion having a noncircular cross section which is formed on the rotary driven member to be capable of coming in contact with the free end of the leaf spring. The speed-change mechanism changes the movement speed of the flash unit by variations of a state of contact of the leaf spring with the noncircular portion which are caused by a rotation of the rotary driven member.

It is desirable for the rotary driven member to include a cam-incorporated gear which is positioned on the rotational axis of the rotary drive member and which includes a gear and a cam having the noncircular cross section.

The speed-change mechanism can include an on-axis gear which rotates in accordance with rotation of the flash unit, a rotational axis of the on-axis gear being coincident with an axis of the pivot of the flash unit; and a reduction gear train provided between the on-axis gear and the cam-incorporated gear.

It is desirable for the flash unit to include a support arm, one end of which is pivoted on the camera body about the pivot; and a light emitting portion fixed to another end of the support arm. The reduction gear train is provided on the support arm along a lengthwise direction thereof.

It is desirable for the support arm to include a pair of support arms which are parallel to each other, the reduction gear train being provided on one of the pair of support arms along a lengthwise direction thereof.

It is desirable for the light emitting portion to include a flashtube and a lens element provided in front of the flash tube.

It is desirable for the leaf spring to include at least two leaf springs.

It is desirable for the biasing device to include a torsion spring positioned around the pivot of the flash unit.

It is desirable for the noncircular cross section of the noncircular portion to be a substantially triangular cross section.

It is desirable for the leaf spring to be disengaged from the noncircular portion of the rotary driven member when the flash unit is in the fully-lifted position.

It is desirable for the leaf spring to be formed in a substantially S-shape.

It is desirable for the pop-up flash to include a locking mechanism for holding the flash unit in the retracted position against a biasing force of the biasing device.

It is desirable for the locking mechanism to include a locking hole formed on one of the flash unit and the camera body; and a catching member fixed to the other of the flash unit and the camera body to be engageable in the locking hole.

It is desirable for the pop-up flash to include a fully-lifted position determining device, positioned between the camera body and the flash unit, for determining a limit of movement of the flash unit in a direction toward the fully-lifted position relative to the camera body.

It is desirable for the fully-lifted position determining device to include an extendable linkage mechanism, one end of the extendable linkage mechanism being pivoted on the camera body, and another end of the extendable linkage mechanism being connected to the flash unit.

In an embodiment, a pop-up flash of a camera is provided, including a retractable flash unit, one end of which is pivoted on a camera body, a light emitting portion being fixed to another end of the flash unit; a biasing device which biases the retractable flash unit to rotate in a direction to make the retractable flash unit project from the camera body; and a speed-change mechanism for changing a speed of rotation of the flash unit while the retractable flash unit rotates in the direction to make the retractable flash unit project from the camera body.

According to the present invention, a pop-up flash of a camera in which the movement speed of the light emitting portion is controlled as appropriate to ensure the movement of the light emitting portion between the retracted position and the fully-lifted position is achieved.

The present disclosure relates to subject matter contained in Japanese Patent Application No. 2004-034028 (filed on Feb. 10, 2004) which is expressly incorporated herein by reference in its entirety.

BRIEF DESCRIPTION OF THE DRAWINGS

The present invention will be described below in detail with reference to the accompanying drawings in which:

FIG. 13 is a front elevational view of internal elements of the digital camera shown in FIGS. 1 and 2, showing internal circuitry thereof;

FIG. 14 is a plan view of the internal elements shown in FIG. 13;

FIGS. 24A, 24B and 24C are explanatory views illustrating operational states of the speed-change mechanism shown in FIG. 23.

DESCRIPTION OF THE PREFERRED EMBODIMENT

Figure 1:
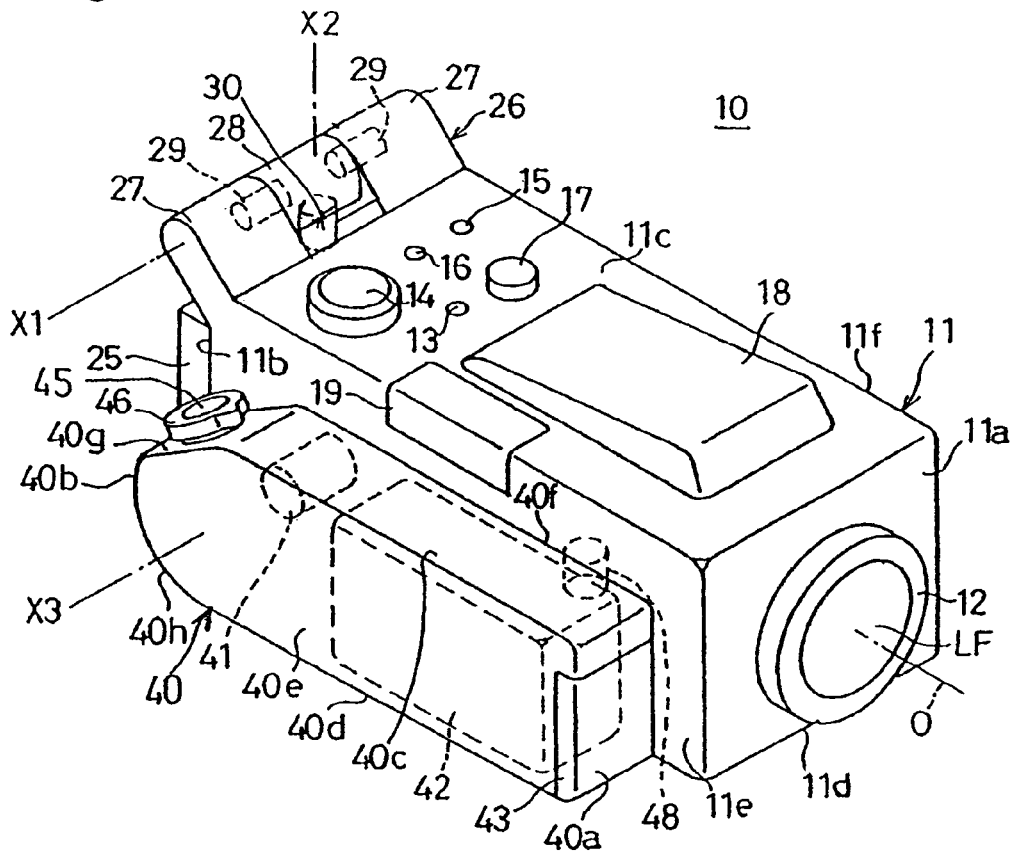
FIG. 1 is a perspective view of an embodiment of a digital camera according to the present invention.
Figure 2:
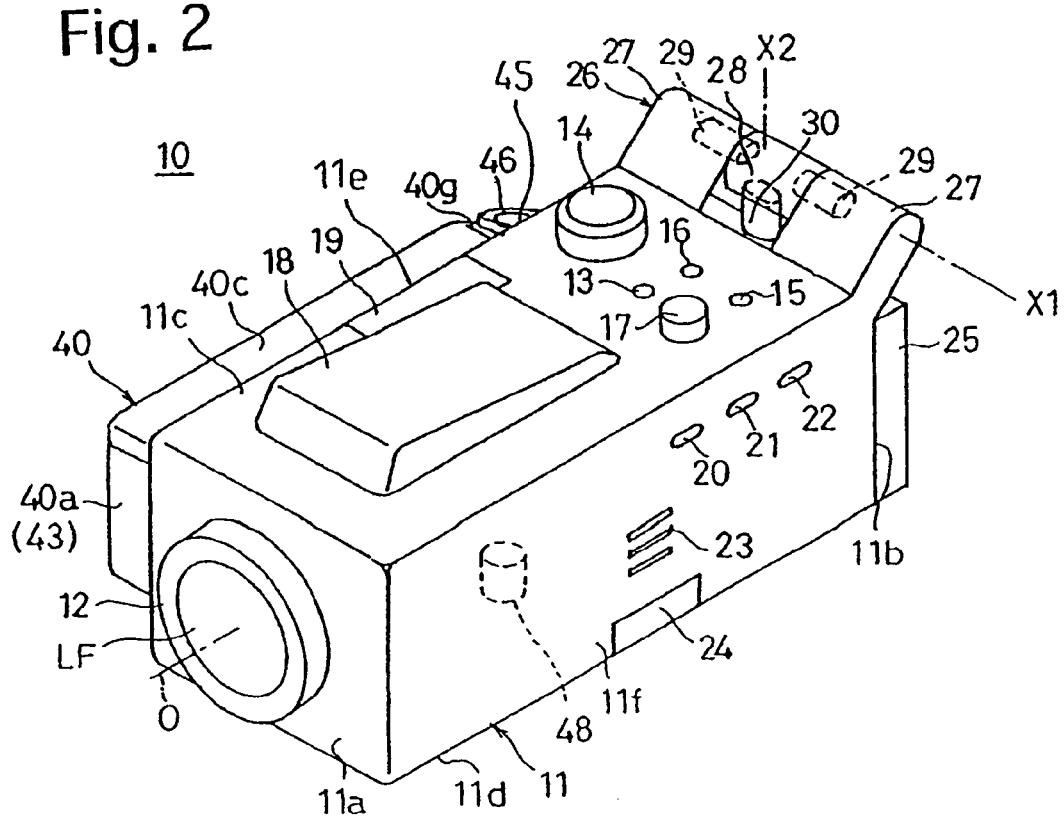
FIG. 2 is a perspective view of the digital camera shown in FIG. 1, viewed from a different angle.
Figure 3:
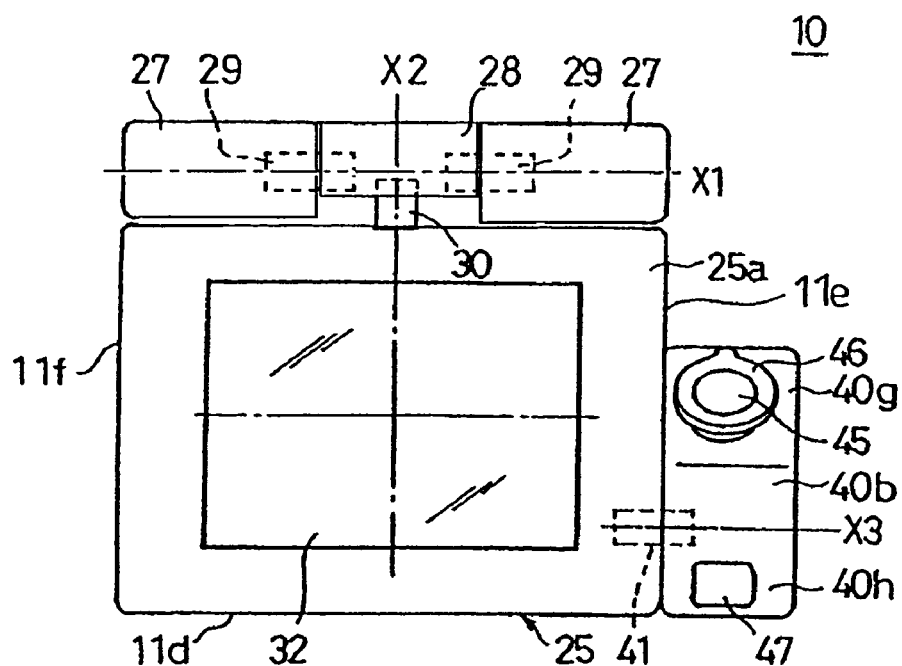
FIG. 3 is a rear elevational view of the digital camera shown in FIGS. 1 and 2.

FIGS. 1 through 12 show an embodiment of a digital camera according to the present invention. This digital camera 10 is provided with a camera body 11 including a photographing optical system. The camera body 11 is formed in a substantially rectangular parallelepiped which is elongated along an optical axis O of the photographing optical system. The outer surface of the camera body 11 is composed of six surfaces: a front end surface 11a, a rear end surface 11b, a top surface 11c, a bottom surface 11d, a right side surface 11e and a left side surface 11f. The top surface 11c, the bottom surface 11d, the right side surface 11e and the left side surface 11f connect the front end surface 11a with the rear end surface 11b, and surround the optical axis O. In the present embodiment of the digital camera, the vertical direction and the horizontal direction of FIGS. 3, 11 and 12 corresponds to the vertical direction and the horizontal direction of the digital camera 10, respectively. More specifically, the right-hand side of the digital camera 10 as viewed from the rear side thereof (as viewed from the side shown in FIG. 3) is defined as the right-hand side of the digital camera 10, while the left-hand side of the digital camera 10 as viewed from the rear side thereof is defined as the left-hand side of the digital camera 10. In addition, a direction parallel to the optical axis O is defined as a forward/rearward direction of the digital camera 10, the side of the front end surface 11a is defined as the front side of the digital camera 10, and the side of the rear end surface 11b is defined as the rear side of the digital camera 10.

The digital camera 10 is provided in the camera body 11 with a frontmost lens group LF of the photographing optical system which is exposed to the outside of the camera body 10 from the front end surface 11a. The frontmost lens group LF can be a lens group consisting of a single lens element or a plurality of lens elements. The camera body 11 is provided, on the front end surface 11a around the frontmost lens group LF, with a filter mounting screw 12 by which an accessory such as a filter can be attached to the front of the frontmost lens group LF. The photographing optical system of the digital camera 10, that is provided inside the camera body 11, is a zoom lens optical system having more than one lens group in addition to the frontmost lens group LF. Specifically, the photographing optical system is an internal-focusing/zooming optical system in which the focus or the focal length is altered by moving elements internally within the lens barrel (i.e., no external lens barrel is extended or retracted). Accordingly, the frontmost lens group LF does not move forward from the position thereof shown in the drawings.

The digital camera 10 is provided, on the top surface 11c of the camera body 11 in an area thereon close to the rear end surface 11b, with a mode select dial 14 and various manual operational buttons such as a power button 13, a playback button 15, a menu button 16 and a multi-direction button 17. The power button 13 serves as a manual operational member for turning ON and OFF a main switch of the digital camera 10. The mode select dial 14 serves as a manual operational member for selecting a desired photographing mode from among different photographing modes. The playback button 15 serves as a manual operational member for reproducing stored images on a liquid crystal display (LCD) portion (LCD panel/image display surface) 32. Upon an operation of the menu button 16, the digital camera 10 enters a setting changing mode in which various settings on the digital camera 10 can be changed and set by operating the multi-direction button 17. The multi-direction button 17 is also used to switch playback images to be displayed on the LCD portion 32. Various settings which can be changed by operating the menu button 16 include the settings of storing image size, image quality (the number of pixels), white balance and sensitivity, but are not limited solely to theses specific settings. The multi-direction button 17 is made of a momentary switch which can be operated to move in different directions. For instance, the multi-direction button 17 can be operated in biaxial directions orthogonal to each other (four directions: forward, rearward, right and left), and also in a press-down direction at an intersection of the aforementioned biaxial directions. The digital camera 10 is provided, on top of the camera body 11, in front of the various manual operational buttons, with a pop-up flash 18. The pop-up flash 18 can be switched between a pop-up position (fully-lifted position) in which a light emitting portion 74 (see FIGS. 19 through 22) of the pop-up flash 18 projects upwards from the top surface 11c of the camera body 11, and a retracted position in which the light emitting portion 74 of the pop-up flash 18 is retracted down on the top surface 11c into the camera body 11. In each of FIGS. 1 through 12, the pop-up flash 18 is in the retracted position, and accordingly the light emitting portion 74 of the pop-up flash 18 is not shown. The camera body 11 is provided in the vicinity of the ridge (border) between the upper surface 11c and the right side surface 11e with a card slot lid 19 for covering a card slot (not shown) formed on the camera body 11. This card slot is accessible from the outside of the camera body 11 by opening the card slot lid 19. In a state in which the cart slot lid 19 is open, a memory card in which image data are stored can be inserted and removed into and from the memory card slot.

The digital camera 10 is provided, on the left side surface 11f of the camera body 11 at regular intervals in the optical axis direction, with a flash mode select button 20, a drive mode select button 21 and a focus mode select button 22. The flash mode select button 20, the drive mode select button 21 and the focus mode select button 22 are positioned in substantially the same range, in the optical axis direction, as the aforementioned various manual operational members 13 through 17) in the optical axis direction. The flash mode select button 20 serves as a manual operational member for controlling the operation of the light emitting portion 74 of the pop-up flash 18. By operating the flash mode select button 20, a desired flash mode can be selected from among different flash modes such as auto flash mode, compulsory flash mode, suppressed flash mode and red-eye reduction mode. The drive mode select button 21 serves as a manual operational button for selecting a drive mode at a shutter release from among different drive modes such as normal drive mode (single-frame mode), multi-frame consecutive photographing mode, self-timer photographing mode and auto-bracketing photographing mode. The focus mode select button 22 serves as a manual operational member for selecting a focus mode from among different focus modes such as normal auto focus mode, macro (close-up) photographing mode, infinity photographing mode and manual focus mode. The digital camera 10 is provided, on the left side surface 11f of the camera body 11 slightly in front of the flash select button 20, with speaker slits 23, and is further provided, on the camera body 11 below the speaker slits 23, with an external connector cover 24. The external connector cover 24 can be opened and closed (or detached and attached) with respect to the left side surface 11f of the camera body 11.

The digital camera 10 is provided at the back of the camera body 11 (on the rear end surface 11b) with an LCD monitor panel (image display portion) 25 which is mounted to the camera body 11 via a hinge portion 26 formed along the ridge (border) between the rear end surface 11b and the top surface 11c. The hinge portion 26 includes a pair of support arms 27, a middle support arm 28 and a pair of pivot pins 29. The pair of support arms 27 project from the camera body 11 at positions thereon laterally apart from each other. The middle support arm 28 to which the LCD monitor panel 25 is fixed to be supported thereby is held between the pair of support arms 27. The pair of pivot pins 29 project in opposite lateral directions away from each other from opposite ends of the middle support arm 28 to be respectively inserted into pin holes of the pair of support arms 27. Due to this structure of the hinge portion 26, the pair of support arms 27 and the middle support arm 28 can rotate relative to each other about the pair of pivot pins 29. An axis X1 of the pair of pivot pins 29 extends in a lateral direction of the digital camera 10 that is orthogonal to the optical axis O. The LCD monitor panel 25 can be manually rotated about the axis X1 between a retracted position (seated position; the position shown in FIGS. 4 and 9) in which the LCD monitor panel 25 is positioned on the rear end surface 11b to sit on the optical axis O, and a full-upright position (the position shown by two-dot chain lines in FIG. 8) in which the LCD monitor panel 25 is fully rotated forward (clockwise as viewed in FIG. 8) about the pair of pivot pins 29 so that an edge of the LCD monitor panel 25 which is on the opposite side of the LCD monitor panel 25 from the middle support arm 28 is positioned above the hinge portion 26. When in the retracted position, the LCD monitor panel 25 lies in a plane substantially orthogonal to the optical axis O. It is desirable that the range of rotation of the LCD monitor panel 25 between the retracted position and the full-upright position be equal to or greater than 180 degrees. In the present embodiment of the digital camera, the range of rotation of the LCD monitor panel 25 is set at about 210 degrees.

The LCD monitor panel 25 is supported by the middle support arm 28 to be rotatable on an axis X2 orthogonal to the axis X1. More specifically, a rotational pin 30 projects from a rectangular frame portion 25a of the LCD monitor panel 25 along the axis X2 thereon, while a pin-insertion hole in which the rotational pin 30 is rotatably fitted is formed on the middle support arm 28. Accordingly, the LCD monitor panel 25 is rotatable on either of the axes X1 and X2.

Although the pair of pivot pins 29 project from the middle support arm 28 to be respectively inserted into the pin holes formed on the pair of support arms 27 in the hinge portion 26 in the above illustrated embodiment of the digital camera 10, it is possible for the pair of pivot pins 29 to project from the pair of support arms 27 to be respectively inserted into pin holes formed on the middle support arm 28.

Although the rotational pin 30 projects from the rectangular frame portion 25a of the LCD monitor panel 25 to be rotatably fitted into the pin-insertion hole formed on the middle support arm 28 in the above illustrated embodiment of the digital camera 10, it is possible for the rotational pin 30 to project from the middle support arm 28 to be rotatably fitted into a pin-insertion hole formed on the rectangular frame portion 25a of the LCD monitor panel 25.

Figure 4:
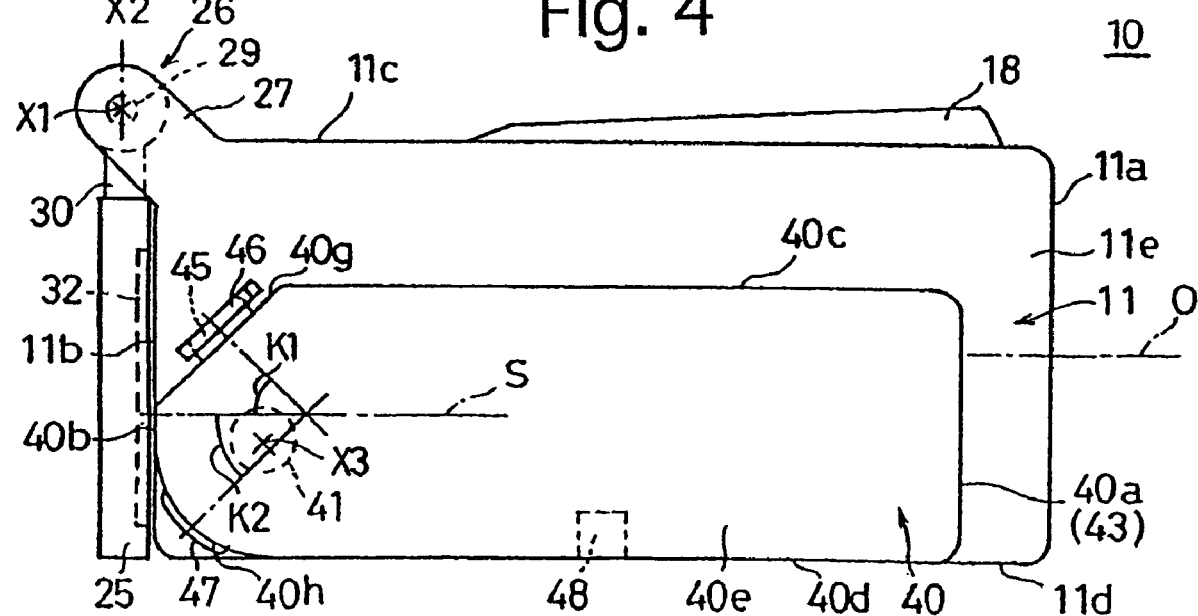
FIG. 4 is a side elevational view of the digital camera shown in FIGS. 1 and 2, viewed from the grip side.
Figure 9:
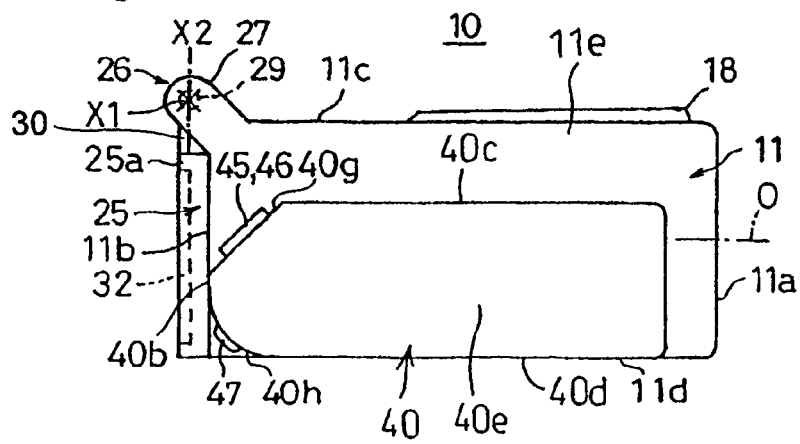
FIG. 9 is a view similar to that of FIG. 4 and shows a state in which the LCD monitor panel is reversed from the position shown in FIG. 4.
Figure 7:
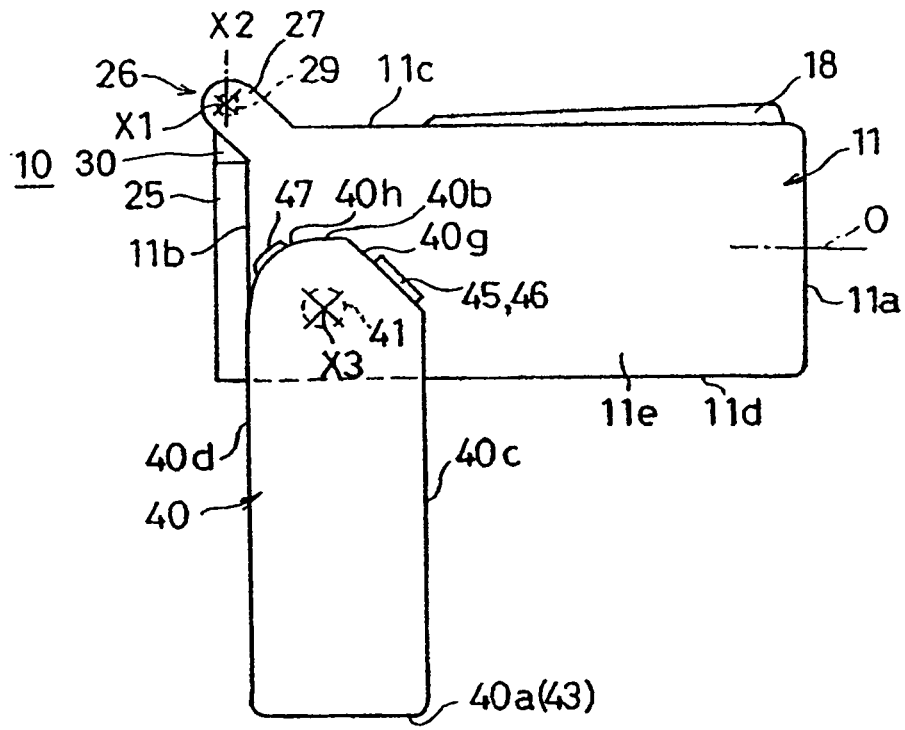
FIG. 7 is a side elevational view of the digital camera shown in FIGS. 1 and 2, showing a state in which the grip is rotated to extend downwards from the camera body.

The frame portion 25a of the LCD monitor panel 25 is provided with four edge portions surrounding the rectangular LCD portion 32. The shape and size of the LCD monitor panel 25 are determined so that three of the four edge portions of the frame portion 25a, except for one of the four edge portions which is adjacent to the middle support portion 28, are substantially flush with the bottom surface 11d, the right side surface 11e and the left side surface 11f, respectively, when the LCD monitor panel 25 is in the retracted position, in which the LCD monitor panel 25 is positioned on the rear end surface 11b of the camera body 11 as shown in FIGS. 4 and 9 (see FIGS. 3 through 9).

Figure 8:
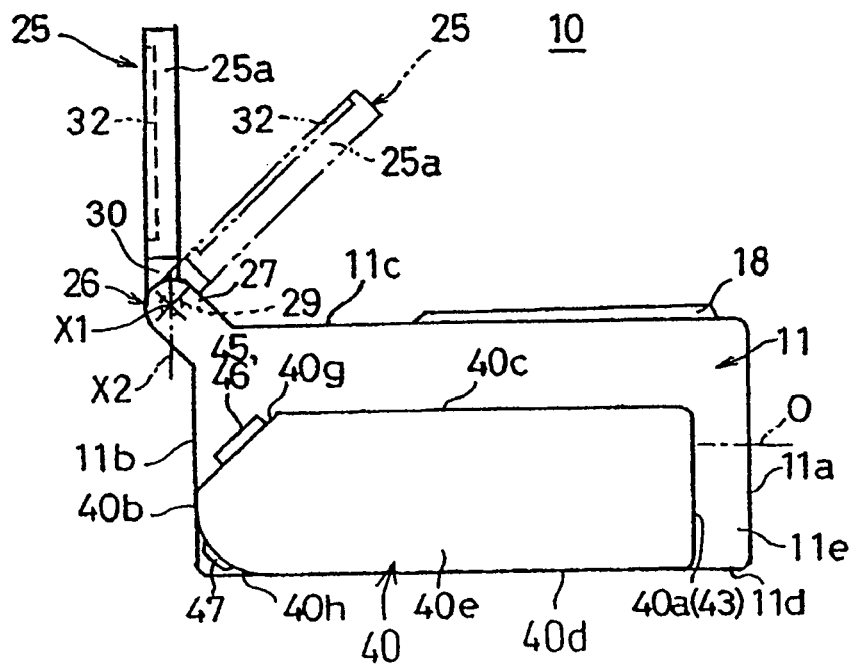
FIG. 8 is a side elevational view of the digital camera shown in FIGS. 1 and 2, showing a state in which an LCD monitor panel is in an upright position.

If the LCD monitor panel 25 is rotated about the axis X1 to stand vertically as shown in FIG. 8 (from the state shown in FIG. 4 in which the LCD portion 32 faces the rear end surface 11b of the camera body 11), the LCD portion 32 faces rearwards (usually toward the user of the digital camera) so that the LCD portion 32 can be used as a monitor for either showing the view through the photographing optical system or displaying stored images during playback. Although FIG. 8 show only two states of the LCD monitor panel 25: a state of the LCD monitor panel 25 that is rotated by approximately 180 degrees from the retracted state thereof to stand vertically (the LCD monitor panel 25 shown by solid lines in FIG. 8), and a state of the LCD monitor panel 25 that is positioned in the aforementioned full-upright position (the position shown by two-dot chain lines in FIG. 8), the hinge portion 26 is provided with a frictional mechanism (or a click mechanism) by which the LCD monitor panel 25 can be stopped at other angular positions between the retracted position and the full-upright position.

Figure 10:
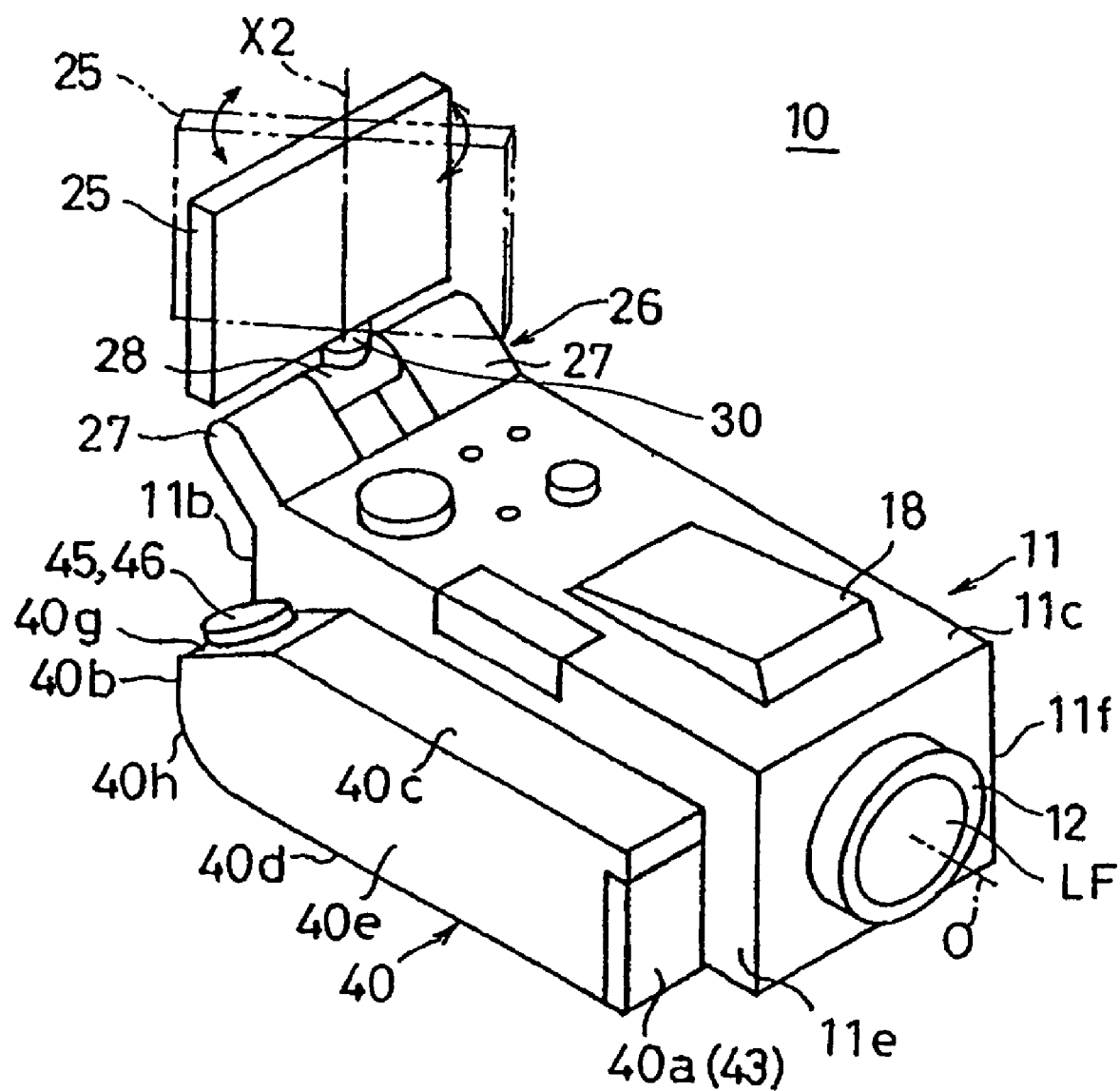
FIG. 10 is a front view in perspective of the digital camera shown in FIGS. 1 and 2, showing a state in which the LCD monitor panel is in an upright position.

The LCD portion 32 in an upright position can be made to face toward the front of the digital camera 10 by rotating the LCD monitor panel 25 about the axis X2 as shown in FIG. 10. Orientating the LCD portion 32 so as to face the front of the digital camera 10 is suitable for the case where the user photographs himself/herself (self portrait) while holding the digital camera 10. From this position, if the LCD monitor panel 25 is rotated about the axis X1 toward the retracted position to a degree that the LCD portion 32 lies in a plane substantially parallel to the top surface 11c of the camera body 11, the LCD portion 32 becomes suitable as a waist-level monitor. Additionally, from this position, if the LCD monitor panel 25 is further rotated about the axis X1 to the rear end surface 11b, the LCD portion 32 faces toward the rear of the digital camera 10, not facing the rear end surface 11b as shown in FIG. 9. In this position shown in FIG. 9, the LCD portion 32 can be viewed without the LCD monitor panel 25 projecting (standing up) from the camera body 11. Although the vertical position of the LCD portion 32 is reversed if the LCD monitor panel 25 is rotated from the position shown in FIG. 8 to the position shown in FIG. 9, or from the position shown in FIG. 9 to the position shown in FIG. 8, the digital camera 10 is provided with a detector which detects a variation in orientation of the LCD monitor panel 25 with respect to the camera body 11, and a display image controller so that the LCD portion 32 displays an image in an upright position when viewed by the user. When the digital camera 10 is carried, it is desirable that the LCD monitor panel 25 be in the retracted position with the LCD portion 32 facing the rear end surface 11b as shown in FIG. 4 to prevent the LCD portion 32 from being damaged.

The digital camera 10 is provide on the right side surface 11e with a grip 40. The grip 40 is formed in a substantially rectangular parallelepiped similar to the camera body 11. The outer surface of the grip 40 includes opposite end surfaces (grip end surfaces) 40a and 40b, and four longitudinal side surfaces 40c, 40d, 40e and 40f which are elongated in a direction orthogonal to both the grip end surfaces 40a and 40b. The grip end surfaces 40a and 40b are substantially parallel to each other, the longitudinal side surfaces 40c and 40d are substantially parallel to each other, and the longitudinal side surfaces 40e and 40f are substantially parallel to each other. The grip 40 is provided inside thereof with a battery chamber in which a battery pack 42 (shown by broken lines in FIG. 1) serving as a power source for driving the digital camera 10 is accommodated. The grip 40 is provided thereon with a battery chamber lid 43, an outer surface of which forms a major portion of the grip end surface 40a.

The grip 40 is pivoted on the camera body 11 about a pivot shaft 41. The pivot shaft 41 connects the grip 40 to the camera body 11 so that the right side surface 11e of the camera body 11 and the longitudinal side surface 40f of the grip 40 are connected to each other via the pivot shaft 41. An axis X3 of the pivot shaft 41 is substantially parallel to the axis X1 of the pair of pivot pins 29 of the hinge portion 26. The position of the pivot shaft 41 (the axis X3) is in the vicinity of the grip end surface 40b, thus being eccentrically positioned from a center of the grip 40 with respect to the lengthwise direction of the grip 40. Accordingly, the grip 40 can be rotated about the axis X3 while the free end of the grip 40 on the grip end surface 40a (the battery chamber lid 43) moves along an arc about the axis X3.

Figure 5:
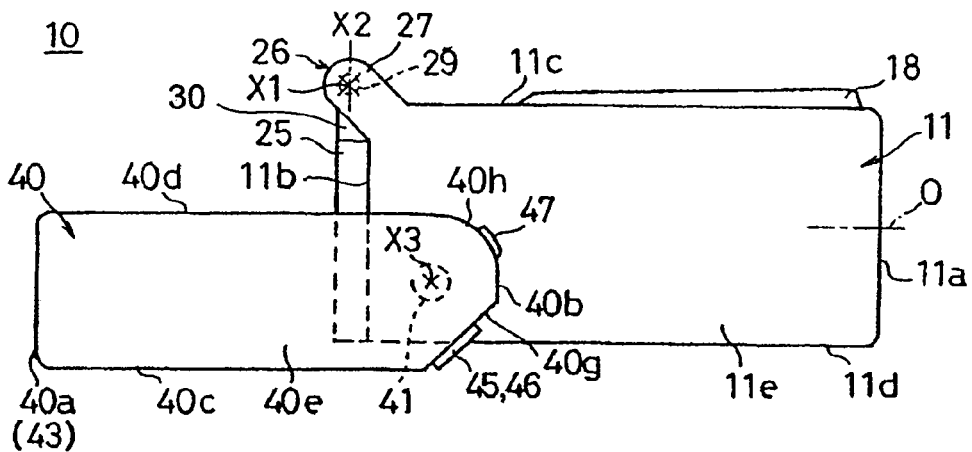
FIG. 5 is a side elevational view of the digital camera shown in FIGS. 1 and 2, showing a state in which the grip is rotated to extend rearwards from the camera body.

FIG. 4 shows a state in which the grip 40 is positioned at one end (retracted position) in the range of rotation of the grip 40, and FIG. 5 shows a state in which the grip 40 is at the other end (rearward-jutting position) of the range of rotation of the grip 40. Although the lengthwise direction of the grip 40 is substantially parallel to the lengthwise direction of the camera body 11 at either the retracted position and the rearward-jutting position, the positions of the opposite ends 40a and 40b of the grip are reversed between the grip 40 shown in FIG. 4 and the grip 40 shown in FIG. 5. When the grip 40 is positioned in the retracted end position as shown in FIG. 4, the grip end surface 40a of the grip 40 (the battery chamber lid 43) faces toward the front of the digital camera 10, and the periphery of the grip 40 is enclosed by the periphery of the right side surface 11e as viewed from the right side of the digital camera 10. In other words, in the state shown in FIG. 4, the entire length of the grip 40 in the lengthwise direction thereof (horizontal direction as viewed in FIG. 4) is included within the length of the camera body 11 in the optical axis direction, while the entire width of the grip 40 in a direction orthogonal to the two longitudinal side surfaces 40c and 40d (in the vertical direction as viewed in FIG. 4) is included within the height of the camera body 11 in the vertical direction of the digital camera 10. Therefore, no part of the grip 40 juts outside the periphery of the camera body 11 in either the forward/rearward direction or the vertical direction of the digital camera 10. Accordingly, in the state shown in FIG. 4, the grip 40 and the camera body 11 appear as a single box unit, so that the digital camera 10 is easy to carry. Moreover, in the state shown in FIG. 4 the digital camera 10 can be placed on a floor or a desk stably because the grip 40 does not project downwards. Accordingly, the digital camera 10 is suitable for taking pictures with the camera body placed on such a flat location without the use of a tripod. When the grip 40 is in the retracted position as shown in FIG. 4, the longitudinal side surface 40d of the grip 40 (the bottom surface of the grip 40 as viewed in FIG. 4) is substantially flush with the bottom surface 11d of the camera body 11 (see FIGS. 3 and 11). This structure improves the stability of the digital camera 10 in the case where the digital camera 10 is placed on a flat location such as a floor or a desk with the bottom surface 11d facing downwards.

During a photographing operation, the grip 40 is rotated clockwise from the retracted position as viewed in FIG. 4 by the user's hand so that the user can thereafter hold the digital camera 10 by holding the grip 40. The pivot shaft 41 is provided with a frictional mechanism (or a click mechanism) by which the grip 40 can be stopped at various angular positions between the retracted position (the position shown in FIG. 4) and the rearward-jutting position (the position shown in FIG. 5). According to this frictional mechanism, the angular position of the grip 40, relative to the camera body 10 can be freely selected by the user. The angular position of the LCD monitor panel 25 with respect to the camera body 11 can be freely adjusted by rotating the LCD monitor panel 25 about the axis X1 or on the axis X2 as described above. By rotating the angular position of the grip 40 about the axis X3 for adjustment, independently of the above described positional adjustment of the LCD monitor panel 25, a high degree of flexibility in photographing posture can be achieved. Specifically, the structure wherein the axis of rotation (the axis X1) of the LCD monitor panel 25 and the axis of rotation (the axis X3) of the grip 40 are parallel to each other and extend in the lateral direction (horizontal direction as viewed in FIG. 3) of the digital camera 10 makes it possible to change both the vertical position and the vertical angle of the digital camera 10 at will without loss of the ability of the digital camera 10 to be held by hand and without loss of the viewability of the LCD portion 32.

Figure 11:
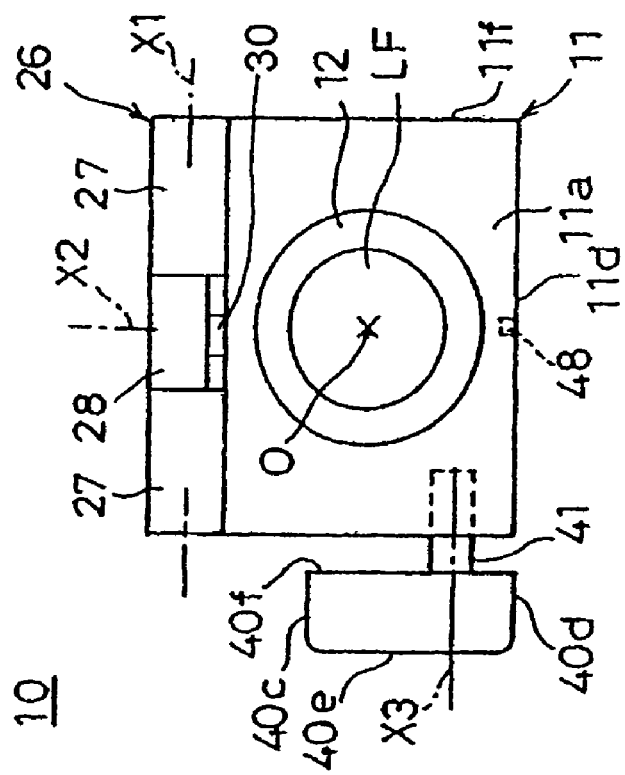
FIG. 11 is a front elevational view of the digital camera shown in FIGS. 1 and 2, showing a state in which the grip is positioned closely to the camera body.
Figure 12:
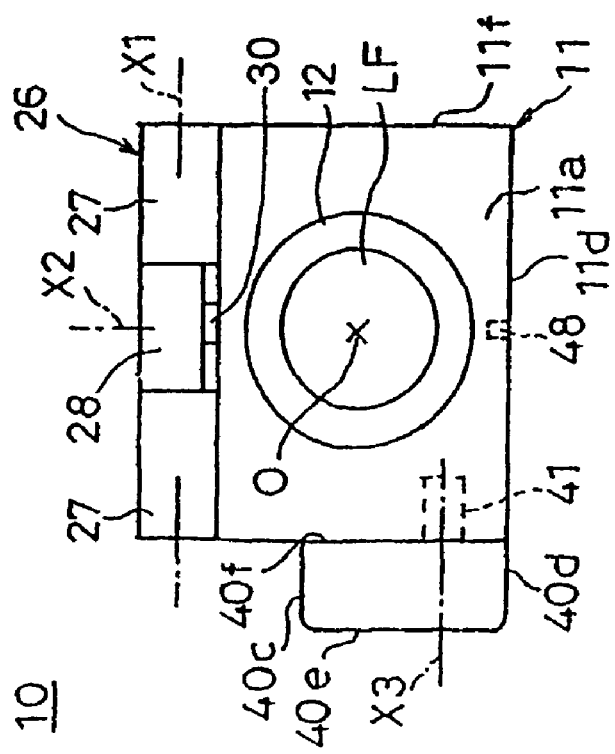
FIG. 12 is a front elevational view of the digital camera shown in FIGS. 1 and 2, showing a state in which the grip is positioned off the camera body.
Figure 15:
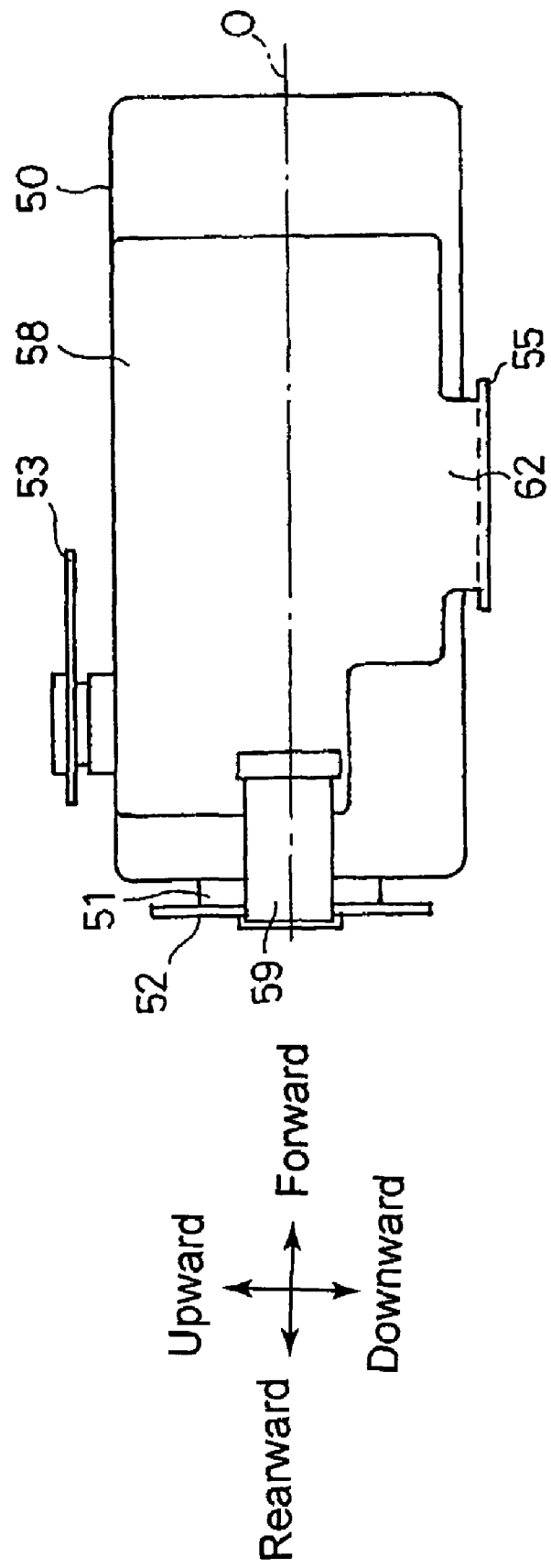
FIG. 15 is a side elevational view of the internal elements shown in FIG. 13.
Figure 16:
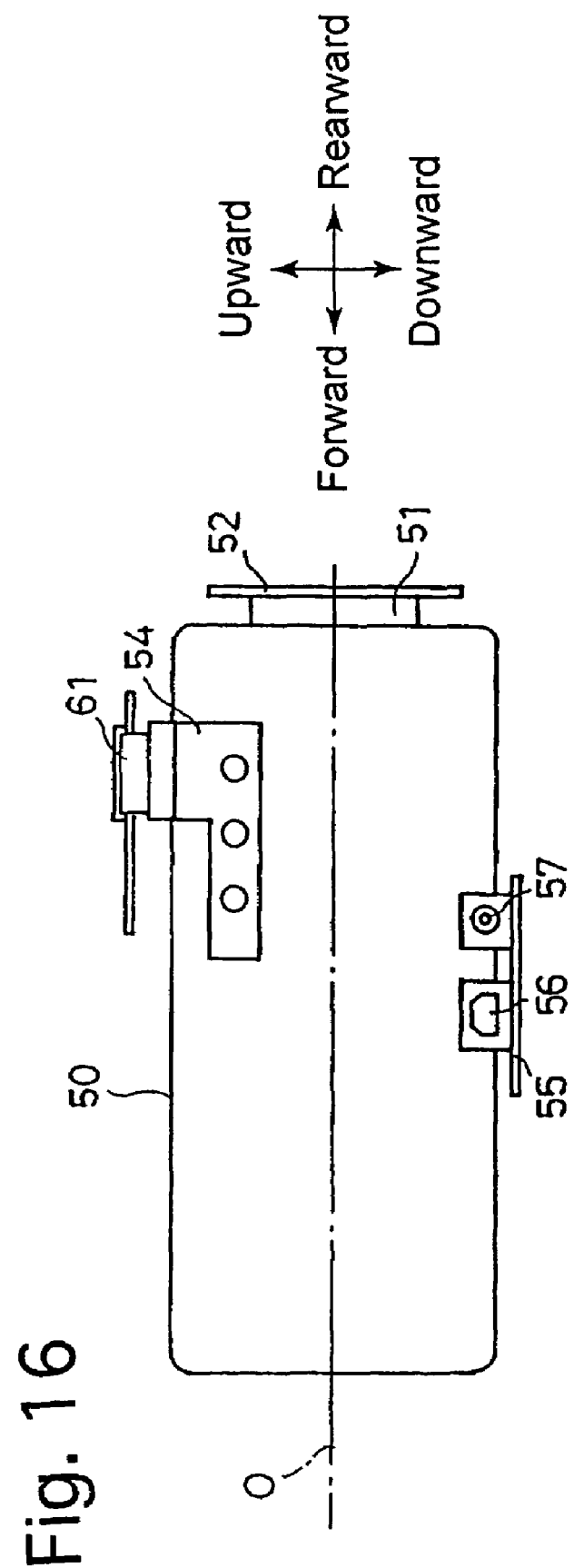
FIG. 16 is a side elevational view of the internal elements shown in FIG. 13, viewed from the side opposite to the side shown in FIG. 15.

The pivot shaft 41 is constructed to allow the grip 40 to be positioned on and jutted away from the right side surface 11e of the camera body 11 in a direction along the axis X3 (the lateral direction of the digital camera 10) as shown in FIGS. 11 and 12. This operation of positioning the grip 40 on and jutted away from the right side surface 11e of the camera body 11 can be performed independently of the above described operation of rotating the grip 40 about the axis X3. For instance, the digital camera 10 can be made compact with the grip 40 jutting from the periphery of the camera body 11 by a minimum amount by positioning the grip 40 close to the camera body 11 when the grip 40 is positioned in the retracted position (the position shown in FIG. 4) as shown in FIG. 11. On the other hand, during a photographing operation, wherein the user holds the grip 40, the camera body 11 (specifically the right side surface 11e thereof) and the user's hand which holds the grip 40 are prevented from interfering with each other by pulling the grip 40 outward (leftward as viewed in FIG. 11) to position where the grip 40 juts away from the camera body 11 by a predetermined distance as shown in FIG. 12, which improves the ability of the grip 40 to be held by hand. Although FIG. 12 shows a state in which the lengthwise direction of the grip 40 is substantially parallel to the lengthwise direction of the camera body 11, from this state the grip 40 can be rotated about the axis X1 to be freely set at any angular position relative to the camera body 11.

As described above, the grip 40 is formed in a substantially box shape (rectangular parallelepiped), and the outer surface of the grip 40 is provided with three pairs of flat surfaces (the two grip end surfaces 40a and 40b, the two longitudinal side surfaces 40c and 40d, and the two longitudinal side surfaces 40e and 40f). The outer surface of the grip 40 is further provided in the vicinity of the grip end surface 40b with an inclined surface 40g which connects the grip end surface 40b with the longitudinal side surface 40c, and a curved surface 40h which constitutes a chamfered portion of the grip end surface 40b at the portion thereof which extends to the longitudinal surface 40d. The inclined surface 40g, the grip end surfaces 40a and 40b, the curved surface 40h and the longitudinal surfaces 40c and 40d constitute a surrounding surface which is substantially parallel to the axis X3 and surrounds the axis X3. The inclined surface 40g is formed as a surface non-parallel to any other external surface of the grip 40. The grip 40 is provided on the inclined surface 40g with a release button 45 and a ring-shaped zoom switch 46 which surrounds the release button 45. The curved surface 40h of the grip end surface 40b is formed to have an external positive curvature. The grip 40 is provided on the curved surface 40h with a moving-image recording button 47. The release button 45 serves as a manual operational member for photographing still images. A photometering operation and a distance measuring operation are carried out when the release button 45 is depressed halfway down, and a shutter is released when the release button 45 is fully depressed. A photographing mode and other settings are set with the above described various manual operational members as appropriate. On the other hand, the moving-image recording button 47 serves as a manual operational member for recording moving images. An operation of recording moving images commences immediately after the moving-image recording button 47 is depressed once, and thereafter stops immediately after the moving-image recording button 47 is depressed once again. The still images and moving images are processed via an image processor to be stored in a memory card as electronic image data.

Figure 6:
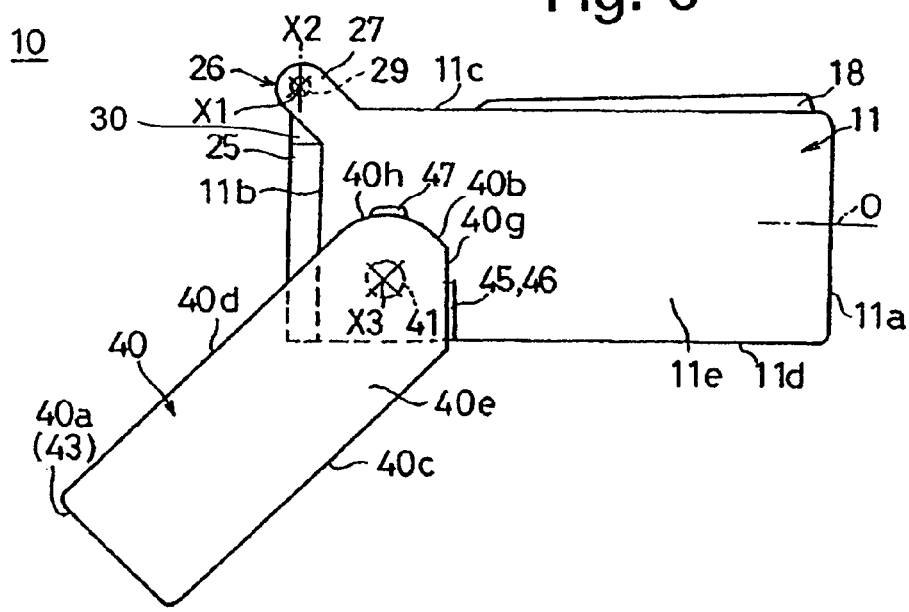
FIG. 6 is a side elevational view of the digital camera shown in FIGS. 1 and 2, showing a state in which the grip is rotated to extend obliquely downwards from the camera body.

As shown in FIG. 4, the inclined surface 40g is formed on the camera body 11 so as to be neither parallel nor orthogonal to a straight line S which extends in a lengthwise direction of the grip 40 between the longitudinal side surfaces 40c and 40d. It is desirable that an angle of inclination K1 of the inclined surface 40g relative to the straight line S be set at an angle between 15 to 75 degrees, more desirably between 30 to 60 degrees. The release button 45 on the inclined surface 40g faces toward the front of the digital camera 10 when the grip 40 is positioned so that the grip end surface 40a (the battery chamber lid 43) faces obliquely rearward and in a downward direction as shown in FIG. 6. In an ordinary photographing posture in which the user holds the digital camera 10 at eye-level or in the vicinity thereof, it is assumed that the grip 40 is positioned within a angular range thereof with the angle of the grip 40 shown in FIG. 6 at a central angle of the angular range. Considering the shape of a human hand, the release button 45 can be easily operated by an index finger (forefinger) if the grip 40 extends obliquely rearward, in a downward direction so that the release button 45 faces substantially toward the front of the digital camera 10 as shown in FIG. 6.

When the grip 40 is in the angular position shown in FIG. 6, the moving-image recording button 47 faces a substantially upward direction of the digital camera 10 so that the position of the moving-image recording button 47 naturally corresponds to the position of the thumb of the user's hand (right hand in the present embodiment of the digital camera) which holds the grip 40 when the index finger is put on the release button 45, due to the moving-image recording button 47 being provided on the grip end surface 40b that is adjacent to the inclined surface 40g and non-orthogonal to the inclined surface 40g. The moving-image recording button 47 is positioned on the curved surface 40h, which is chamfered so as to have an external positive curvature, and also the moving-image recording button 47 projects obliquely outwards in an inclination direction substantially opposite (symmetrical) to the axis of the release button 45 with respect to the straight line S (which extends in a lengthwise direction of the grip 40 between the longitudinal side surfaces 40c and 40d, as shown in FIG. 4). With this positional relationship between the moving-image recording button 47 and the release button 45, in which the pressing direction of the moving-image recording button 47 is inclined with respect to the pressing direction of the release button 45, the thumb of the user's hand (right hand in the present embodiment of the digital camera) holding the grip 40 can be put on the moving-image recording button 47 more naturally, which further improves the operability of the digital camera 10. It is desirable that an angle of inclination K2 of the moving-image recording button 47 relative to the straight line S be set at an angle substantially equal to the angle K1 of the inclined surface 40g (i.e., an angle of the release button 45 relative to the straight line S).

Accordingly, when the grip 40 is in the angular position shown in FIG. 6, in which the grip 40 is orientated to extend obliquely downwards, or in an angular position in the vicinity thereof, the release button 45 substantially faces an upward direction of the digital camera 10, the moving-image recording button 47 substantially faces a frontward direction of the digital camera 10, and the position of the moving-image recording button 47 naturally corresponds to the position of the thumb of the user's hand when the user holds the grip 40 with the index finger placed on the release button 45. Namely, the release button 45 and the moving-image recording button 47 are disposed on the grip 40 at positions so as to allow the user to operate the release button 45 and the moving-image recording button 47 easily and naturally when the grip 40 is rotated to be set in an operating position (ready-to-photograph position) as shown in FIG. 6.

The angle of the grip 40 relative to the camera body 11 in a ready-to-photograph state is not limited solely to those shown in FIGS. 5 and 6. For instance, when the user takes still or moving images while holding the digital camera 10 above their head, the grip 40 may be positioned at a substantially right-angle relative to the camera body 11 so that the grip end surface 40a (the battery chamber lid 43) faces vertically downwards. In this case, it is conceivable that the user holds the grip 40 with their hand while straightening the arm vertically upwards so that the arm extends in a direction substantially parallel to the lengthwise direction of the grip 40, and accordingly, the index finger and the thumb of the hand holding the grip 40 can be naturally placed on the release button 45 and the moving-image recording button 47, respectively, similar to the case shown in FIG. 6, which allows the user to operate the release button 45 and the moving-image recording button 47 comfortably.

The grip 40 is supported on the pivot shaft 41 at a position on the grip 40 which is eccentric to a center of the grip 40 in the lengthwise direction thereof to be positioned in the vicinity of the grip end surface 40b, and the release button 45 and the moving-image recording button 47 are disposed at positions on the grip 40 in radially outward directions from the pivot shaft 41 (the axis X3) in the relatively close vicinity of the pivot shaft 41. Accordingly, the positions of the release button 45 and the moving-image recording button 47 are not displaced largely with respect to the camera body 11 when the grip 40 is rotated relative to the camera body 11, which does not easily deteriorate the operability of each of the release button 45 and the moving-image recording button 47. Additionally, the release button 45 and the moving-image recording button 47 are positioned substantially on an imaginary cylindrical surface about the pivot shaft 41 (the axis X3), so that either the distance from the pivot shaft 41 to the release button 45 or the distance from pivot shaft 41 to the moving-image recording button 47 does not change even if the grip 40 is rotated. This arrangement also facilitates the operability of the release button 45 and the moving-image recording button 47.

As can be understood from the above description, the positions of the release button 45 and the moving-image recording button 47 are determined so that the user can easily operate the release button 45 and the moving-image recording button 47 regardless of the angle of the grip 40 relative to the camera body 11.

The camera body 11 is provided on the bottom surface 11d with a tripod socket (female screw hole) 48 which is open downwards from the camera body 10 (see FIG. 4). Since the LCD monitor panel 25 and the grip 40 are supported on the rear end surface 11b and the right side surface 11e, respectively, neither the LCD monitor panel 25 nor the grip 40 overlap the bottom surface 11d of the camera body 11 even if rotated. Therefore, the tripod socket 48 is never covered by either of the LCD monitor panel 25 and the grip 40. Accordingly, even though the digital camera 10 is provided on the camera body with two independent rotatable members: the grip 40 and the LCD monitor panel 25, a photographing operation using a tripod can be carried out regardless of the of the positions of the LCD monitor panel 25 and the grip 40. Moreover, the digital camera 10 can be stably put on a floor or the like without the use of a tripod if the grip 40 is rotated to the retracted position. Namely, the digital camera 10 can be used not only in an ordinary situation in which the user takes still or moving images while holding the digital camera 10 with their hand but also in other photographing positions.

In a photographing operation, with the user holding the digital camera 10, it is generally the case that the user holds the digital camera 10 with their right hand gripping the grip 40 and with their left hand holding the camera body 11. Furthermore, it is normally the case that the palm of the left hand supports the camera body 11 from the bottom surface 11d while the thumb of the left hand is laid on the left side surface 11f, and accordingly, there is little possibility of performing an unintentional operation due to no manual operational members being provided on the bottom surface 11d. The bottom surface 11d comes in contact with the left hand by an area larger than any other external surface portions of the digital camera 10. Moreover, the photographing mode and other settings can be set without changing the user's photographing posture because the manual operational members which are frequently used during photographing, such as the flash mode select button 20, the drive mode select button 21 and the focus mode select button 22, are positioned on the left side surface 11f, on which the thumb of the left hand is placed.

During playback of recorded still and/or moving images on the LCD portion 32, it is assumed that the user holds the digital camera 10 with some fingers placed on the upper surface 11c of the camera body 11. Accordingly, manual operational members used for playback images are positioned on the top surface 11c, so that the user can easily operate these manual operational members without changing the above described photographing posture. During playback of recorded still and/or moving images, the user can hold the digital camera 10 with both hands holding the camera body 11 with the grip 40 positioned in the retracted position.

FIGS. 13 through 16 show the internal circuitry of the digital camera 10, viewed from different angles. The digital camera 10 is provided in the camera body 11 with a hollow-cylindrical holder 50 which supports the photographing optical system of the digital camera 10. The holder 50 holds the photographing optical system so that the axis of the holder 50 is coincident with the optical axis O. The holder 50 is provided at the front end thereof with an aperture 50a for holding the frontmost lens group LF therein. The digital camera 10 is provided in the camera body 11 with a CCD image sensor 51 mounted to a CCD substrate 52. The CCD image sensor 51 is fixed at the rear end of the holder 50 via the CCD substrate 52. Although the holder 50 that serves as a member for holding the photographing optical system is formed as a single member for the purpose of making the location of the photographing optical system easier to recognize, the holding member does not have to be formed as a single member like the holder 50.

The CCD image sensor 51 and other optical elements such as the frontmost lens group LF are elements of the photographing optical system of the digital camera 10. The CCD substrate 52 is positioned between the rear end of the holder 50 and the rear end surface 11b of the camera body 11 to lie in a plane substantially orthogonal to the optical axis O. In addition to the CCD substrate 52, the digital camera 10 is provided in the camera body 11 with a first switch substrate 53, a second switch substrate 54, a jack substrate 55 and a main substrate 58. The first switch substrate 53 is formed as a flat board, and is positioned between the holder 50 and the top surface 11c of the camera body 11 to be substantially parallel to the top surface 11c. The power button 13, the mode select dial 14, the playback button 15, the menu button 16 and the multi-direction button 17 are mounted to the first switch substrate 53. The second switch substrate 54 is formed as a flat board, and is positioned between the holder 50 and the left side surface 11f of the camera body 11 to be substantially parallel to the left side surface 11f. The flash mode select button 20, the drive mode select button 21 and the focus mode select button 22 are mounted to the second switch substrate 54. The jack substrate 55 is formed as a flat board, and is positioned between the holder 50 and the bottom surface 11d of the camera body 11 to be substantially parallel to the bottom surface 11d. A PC jack 56 for connection to a personal computer and an adapter jack 57 for power adapter (e.g., AC adapter) are mounted to the jack substrate 55. The PC jack 56 and the adapter jack 57 are positioned on the left side surface 11f to be accessible from the outside of the camera body 11 if the external connector cover 24 is opened. The main substrate 58 is formed as a flat board, and is positioned between the holder 50 and the right side surface 11e of the camera body 11 to be substantially parallel to the right side surface 11e. Various components such as a microcomputer for controlling the overall operation of the digital camera 10 and a circuit for processing image data are mounted to the main substrate 58. The main substrate 58 is greater in length than any of the first switch substrate 53, the second switch 54 and the jack substrate 55 in the optical axis direction (forward/rearward direction of the digital camera 10). The CCD substrate 52 and the first switch substrate 53 are connected to the main substrate 58 via a flexible PWB 59 and a flexible PWB 60, respectively. The second switch substrate 54 is connected to the first switch substrate 53 via a flexible PWB 61 to send signals to the main substrate 58 via the first switch substrate 53. The jack substrate 55 is connected to the main substrate 58 via a connector 62.

As can be seen from FIGS. 13 through 16, the photographing optical system (the holder 50) of the digital camera 10 is positioned in an internal space thereof which is surrounded by a circuit board consisting of the CCD substrate 52, the first switch substrate 53, the jack substrate 55 and the main substrate 58. Specifically, the photographing optical system that is provided in the present embodiment of the digital camera is an internal-focusing/zooming optical system, in which the focus or the focal length is altered by moving elements internally within the lens barrel as mentioned above, and accordingly no portion of the photographing optical system projects forward from the front of the camera body 11, and therefore remains within the camera body 11 at all times. Additionally, the CCD substrate 52, the first switch substrate 53, the jack substrate 55 and the main substrate 58 are positioned in the camera body 11 to surround the photographing optical system. This circuit arrangement saves space for electrical components in the camera body 11, thus contributing to improvement in degree of freedom in miniaturization and design of the digital camera 10. The camera body 11 is formed as a substantially rectangular parallelepiped which is elongated along the optical axis O specifically in the illustrated embodiment of the digital camera as mentioned above, and this shape of the camera body 11 is advantageous to install the first switch substrate 53, the second switch substrate 54, the jack substrate 55 and the main substrate 58 along an inner surface of the camera body 11 which extends in the lengthwise direction of the camera body 11.

In the present embodiment of the digital camera, the rotatable grip 40 is mounted to the right side surface 11e of the camera body 11. It is desirable that no elements such as operational switches or terminals (jacks) be provided on a surface of the camera body to which a rotatable member such as the grip 40 is mounted in order to prevent the rotatable member from interfering with such elements. To this end, the first switch substrate 53 and the second switch substrate 54, which include switch contacts, and the jack substrate 55, which includes electrical terminals, are installed along three inner surfaces of the camera body 11 which correspond to the top surface 11c, the bottom surface 11d and the left side surface 11f, respectively, and no substrate is installed along an inner surface of the camera body 11 which corresponds to the right side surface 11e. By taking advantage of this structure in which no elements such as switches or terminals are installed (cannot be installed) to the right side surface 11e of the camera body 11, the main substrate 58, which does not have to be connected to any external parts or devices, is installed in the immediate area of the inner surface of the camera body 11 which corresponds to the right side surface 11e. As can be seen from FIGS. 14 and 15, the internal space of the camera body 11 on the right side surface 11e is exclusively assigned to the installation of the main substrate 58, which makes it possible to adopt the large main substrate 58 that is shaped to have a length close to the length of the holder 50 in the optical axis direction.

Likewise, no elements such as switches or terminals are installed on the rear end surface 11b of the camera body 11, which supports the movable LCD monitor panel 25 (a movable member like the grip 40), while the CCD substrate 52, which does not have to be connected to any external parts or devices similar to the main substrate 58, is installed in the immediate area of an inner surface of the camera body 11 which corresponds to the rear end surface 11b. In terms of the efficiency of saving space and simplifying circuitry, it is desirable that the CCD substrate 52, on which the CCD image sensor 51 is mounted, be positioned in the internal space of the camera body 11 in the vicinity of the rear end surface 11b since the internal space of the camera body 11 in the vicinity of the rear end surface 11b is adjacent to the rear end of the photographing optical system.

As can be understood from the above descriptions, in the above illustrated embodiment of the digital camera, a high degree of flexibility in photographing posture and an improvement in operability of the digital camera 10 are obtained by designing the LCD monitor panel 25 and the grip 40 to be rotatable independently of each other. In addition, the release button 45 and the moving-image recording button 47 are easy to operate regardless of the rotational position (angular position) of the grip 40.

In the above illustrated embodiment of the digital camera, the placement of the circuitry in the camera body 11 and also the placement of the manual operational members on the outer surface of the camera body 11 are well devised as described above, which achieves a high functionality of the camera body 11.

Figure 17:
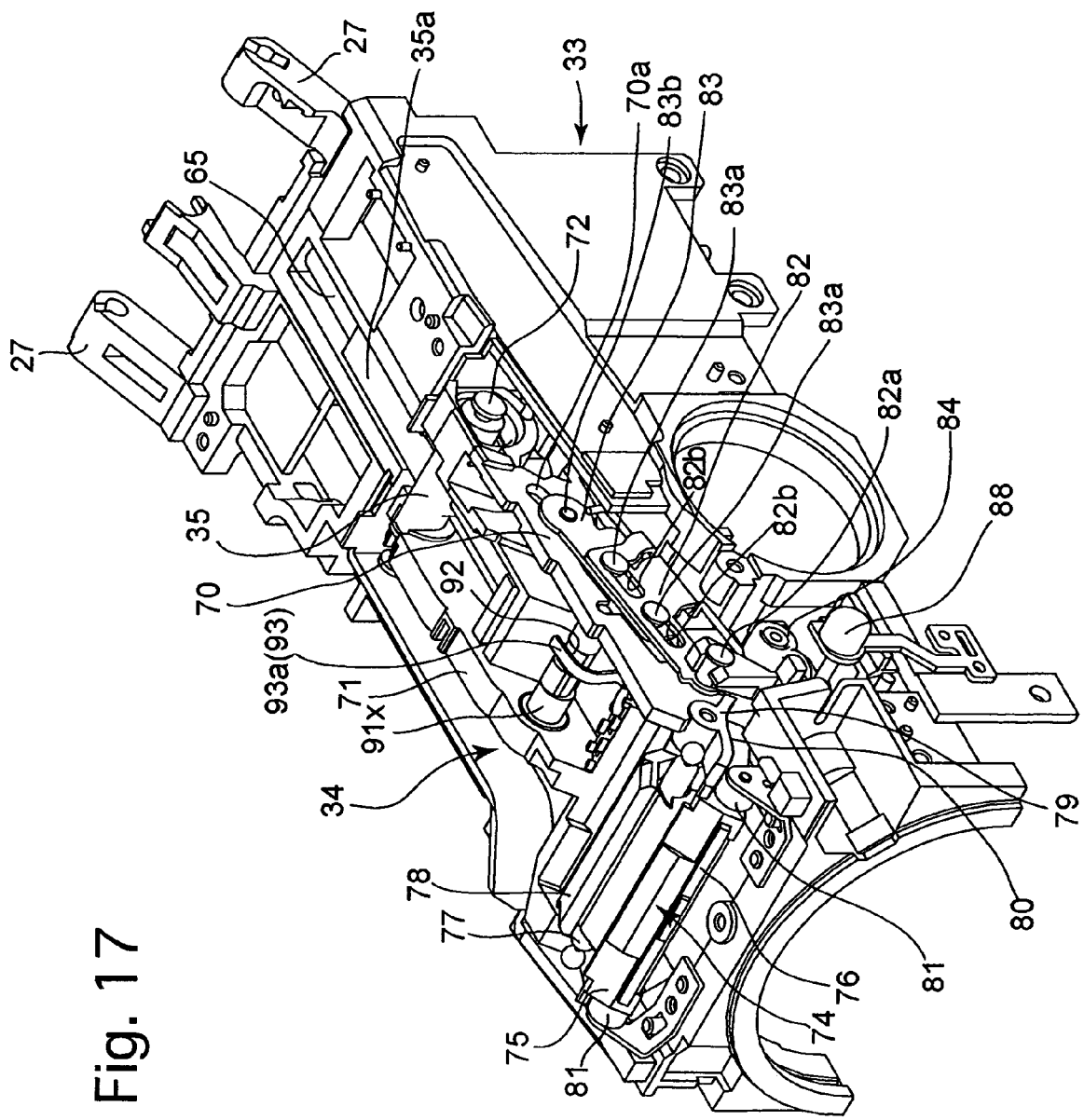
FIG. 17 is a perspective view of elements of the camera body of the digital camera shown in FIGS. 1 and 2, viewed obliquely from the front thereof, and showing a pop-up flash with a top decorative cover of the camera body being removed.
Figure 18:
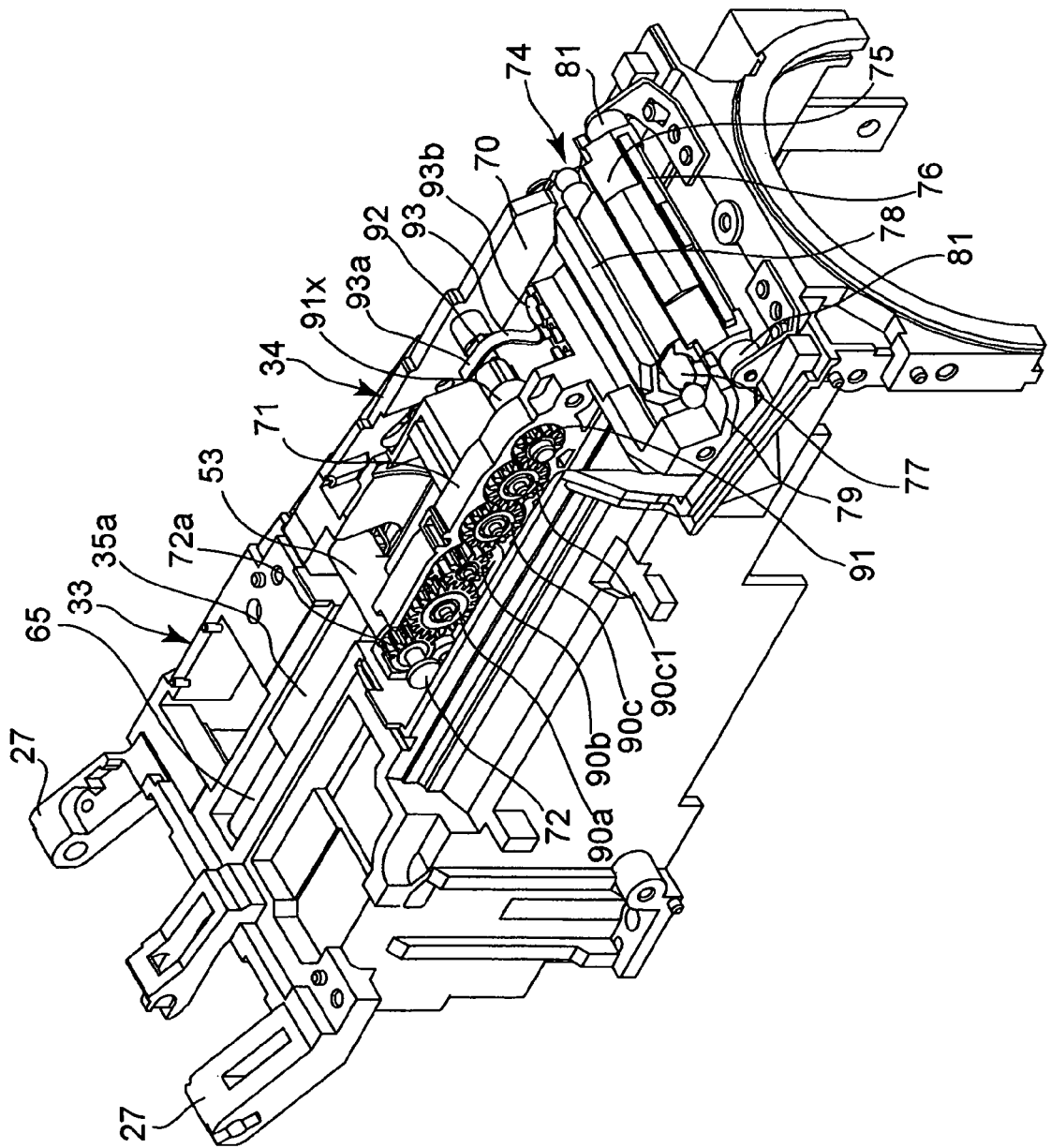
FIG. 18 is a perspective view of the elements of the camera body shown in FIG. 17, viewed obliquely from front thereof from a different angle.

The structure of the pop-up flash 18 will be hereinafter discussed in detail with reference to FIGS. 17 through 24. FIGS. 17 and 18 show an internal structure of the camera body 11 with a top decorative cover thereof being removed. The camera body 11 is provided therein with a body frame 33 on a top surface of which a flash accommodation portion 33a is formed (see FIGS. 19 through 21). The pop-up flash 18 is provided with a flash unit 34 and a slidable member 35. The flash unit 34 is retractable into the flash accommodation portion 33a to be accommodated therein. The slidable member 35 is mounted on the body frame 33 to be movable forward and rearward. The flash unit 34 is pivoted at a front end portion of the slidable member 35.

Figure 19:
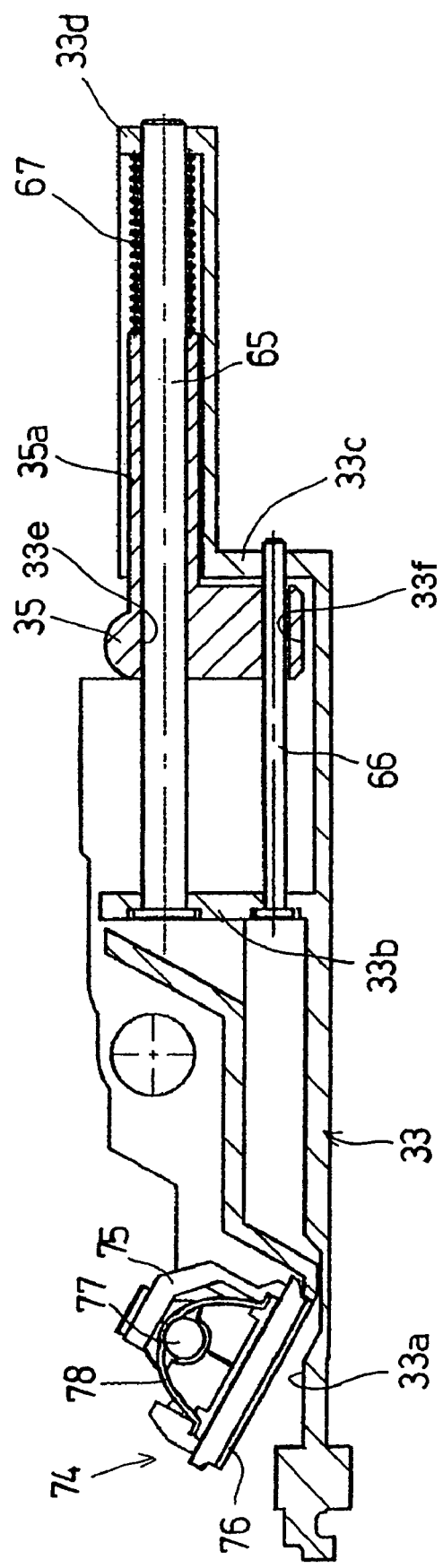
FIG. 19 is a longitudinal cross sectional view of elements of the camera body of the digital camera shown in FIGS. 1 and 2 in a retracted state of the pop-up flash.

The body frame 33 is provided with a slidable-member guide shaft 65 having a uniform cross section which extends in substantially a forward/rearward direction of the camera body 11 (in a direction substantially parallel to the optical axis O). As shown in FIG. 19, the opposite ends of the slidable-member guide shaft 65 are fixed to the body frame 33. The body frame 33 is provided below the slidable-member guide shaft 65 with a sub-guide shaft 66 which extends parallel to the slidable-member guide shaft 65. Similar to the slidable-member guide shaft 65, the opposite ends of the sub-guide shaft 66 are fixed to the body frame 33. The slidable member 35 is provided with a large-diameter hole 33e and a small-diameter hole 33f (see FIG. 19) in which the slidable-member guide shaft 65 and the sub-guide shaft 66 are slidably fitted, respectively. Due to the engagement of the large-diameter hole 33e and the small-diameter hole 33f with the slidable-member guide shaft 65 and the sub-guide shaft 66, respectively, the slidable member 35 is movable in the forward/rearward direction of the camera body 11 between an advanced position (close to the object to be photographed) and a retreated position (far from the object to be photo-graphed). Forward and rearward moving limits of the slidable member 35 with respect to the slidable-member guide shaft 65 and the sub-guide shaft 66 are determined by a front wall 33b and a first rear wall 33c which are formed on the body frame 33, respectively. The slidable member 35 is provided along the slidable-member guide shaft 65 with a sleeve 35a extending rearwards in which the large-diameter hole 33e is formed. The slidable member 35 is biased forward by a compression coil spring (slidable-member biasing device) 67 which is fitted on the slidable-member guide shaft 65 and positioned between the rear end of the sleeve 35a and a second rear wall 33d of the body frame 33.

The flash unit 34 is provided with a pair of parallel support arms 70 and 71 which are positioned apart from each other in the lateral direction of the camera body 11. The pair of support arms 70 and 71 are provided at rear ends thereof with a pair of circular holes having a common axis, respectively, in which a pivot shaft 72 is rotatably fitted. The pivot shaft 72 is inserted into the pair of circular holes of the pair of support arms 70 and 71 to be supported by the pair of support arms 70 and 71 so that the axis of the pivot shaft 72 extends in a direction substantially orthogonal to the optical axis O, specifically in the lateral direction of the camera body 11. Due to this structure, the flash unit 34, which includes the pair of support arms 70 and 71, is rotatable about the axis of the pivot shaft 72 between a fully-retracted position (the position shown in FIG. 20) and a fully-lifted position (pop-up position; the position shown in FIG. 21). The flash unit 34 is biased to rotate toward the fully-lifted position by a torsion spring (an element of a flash-unit biasing device) 73. One end and the other end of the torsion spring 73 are engaged with the support arm 70 and the slidable member 35, respectively.

The light emitting portion 74 is supported by the pair of support arms 70 and 71 at the free ends (front ends) thereof. The light emitting portion 74 is constructed so that a flash lens (Fresnel lens) 76 is fixed to a front surface of a flash body 75 fixed to (or formed integral with) the pair of support arms 70 and 71 and so that a xenon flashtube 77 and a reflector 78 are supported by the flash body 75 behind the flash lens 76. The flash body 75 is provided at laterally opposite ends thereof with a pair of guide fins 79, respectively. A surface of each guide fin 79, which faces toward the front of the traveling direction of flashlight when the flash unit 34 is in the fully-lifted position, is formed as a waveform roller guide surface 80. More specifically, the roller guide surface 80 of each guide fin 79 has a continuous waveform surface including a concave surface 80a and a convex surface 80b which are positioned so that the convex surface 80b is closer to the front end of the flash unit 34 (the front ends of the pair of support arms 70 and 71) than the concave surface 80a, and so that the concave surface 80a is closer to the pivoted end of the flash unit 34 (the pivoted ends of the pair of support arms 70 and 71). The shapes of the pair of roller guide surfaces 80 are identical to each other. Note that each roller guide surface 80 is formed as a single continuous surface though divided into two parts (the concave surface 80a and the concave surface 80b) for the purpose of illustration.

Figure 21:
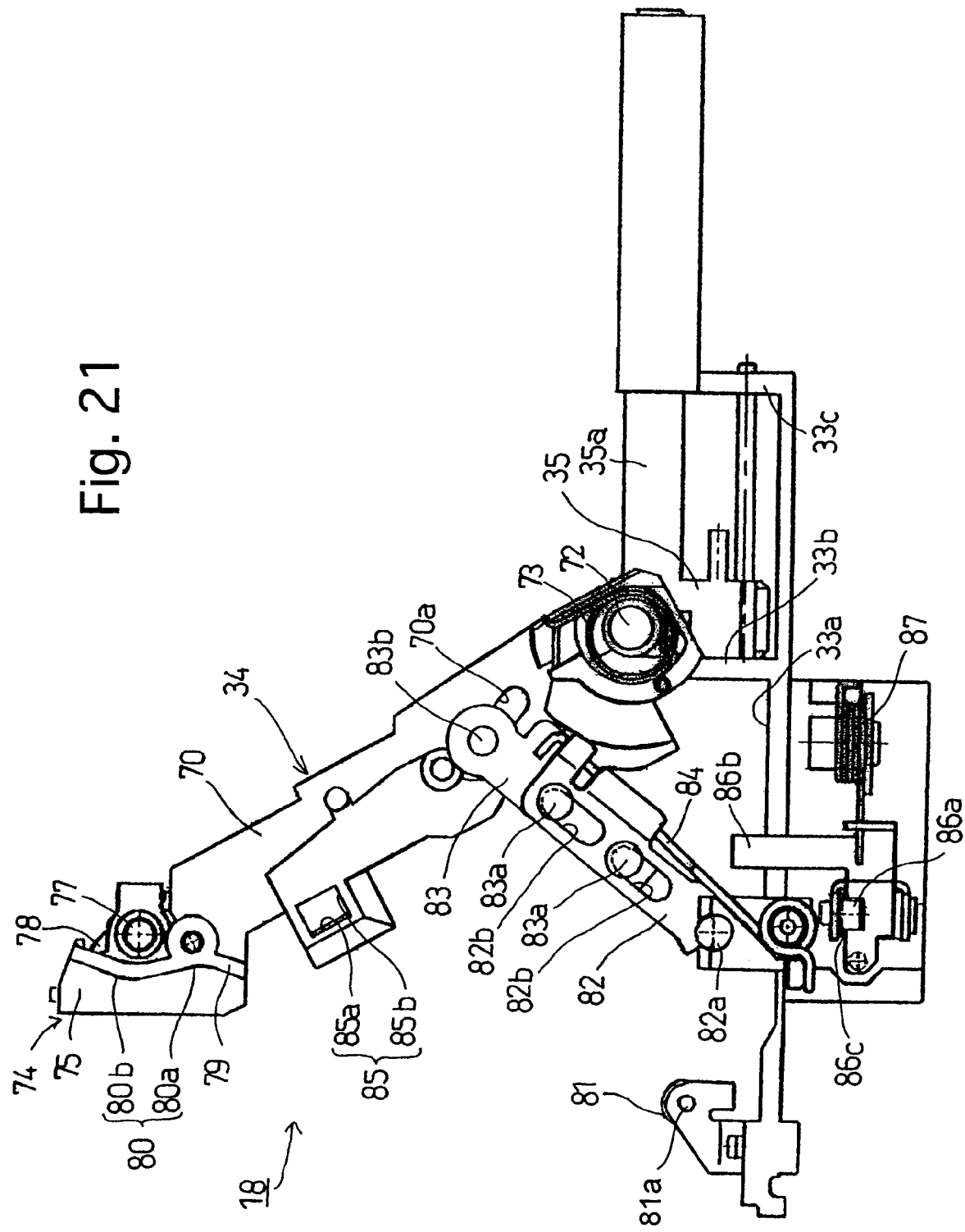
FIG. 21 is a side elevational view of the elements of the camera body shown in FIG. 20 in a popped-up state (fully-lifted state) of the pop-up flash.
Figure 22:
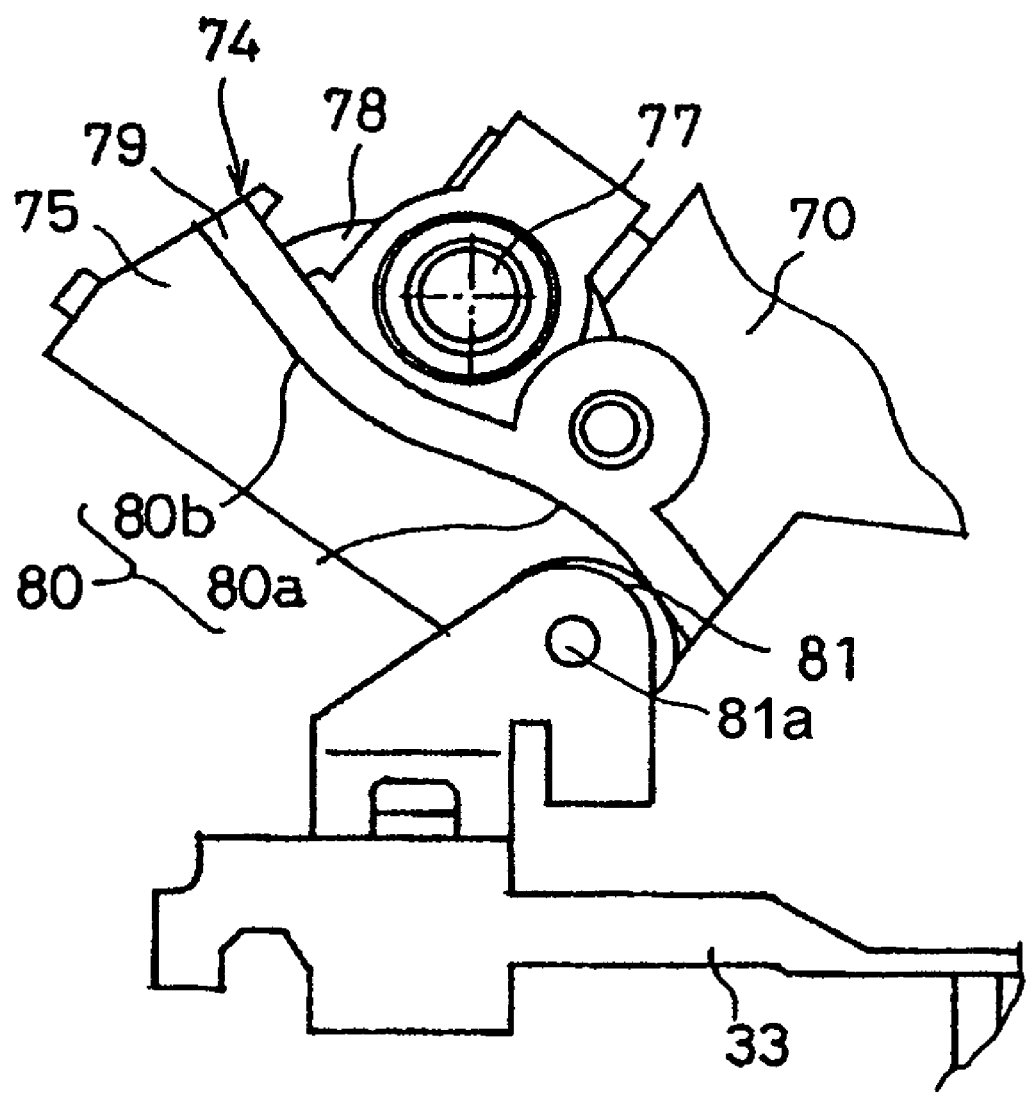
FIG. 22 is a side elevational view of a portion of the elements shown in FIGS. 20 and 21, showing a state of the engagement of a roller and a roller guide surface (roller contacting surface) when the pop-up flash is rotated toward the retracted position from the popped-up state shown in FIG. 21.

The body frame 33 is provided in the vicinity of the front end thereof with a pair of guide rollers 81 which are respectively positioned on moving paths of the roller guide surfaces 80 of the pair of guide fins 79, which move on the moving paths when the flash unit 34 rotates about the pivot shaft 72. The pair of guide rollers 81 are provided on the body frame 33 at positions in which the pair of guide rollers 81 respectively contact the concave surfaces 80a of the pair of roller guide surfaces 80 as shown in FIG. 22 when the flash unit 34 is rotated toward the retracted position (counterclockwise direction in FIG. 21) from a state (shown in FIG. 21) where the slidable member 35 is in the advanced position. The pair of guide rollers 81 are rotatable on a pair of rotational pins 81*a*, respectively, which are parallel to the pivot shaft 72. The outer peripheral surface of each guide roller 81 is a cylindrical surface concentric to the associated rotational pin 81*a*.

Figure 20:
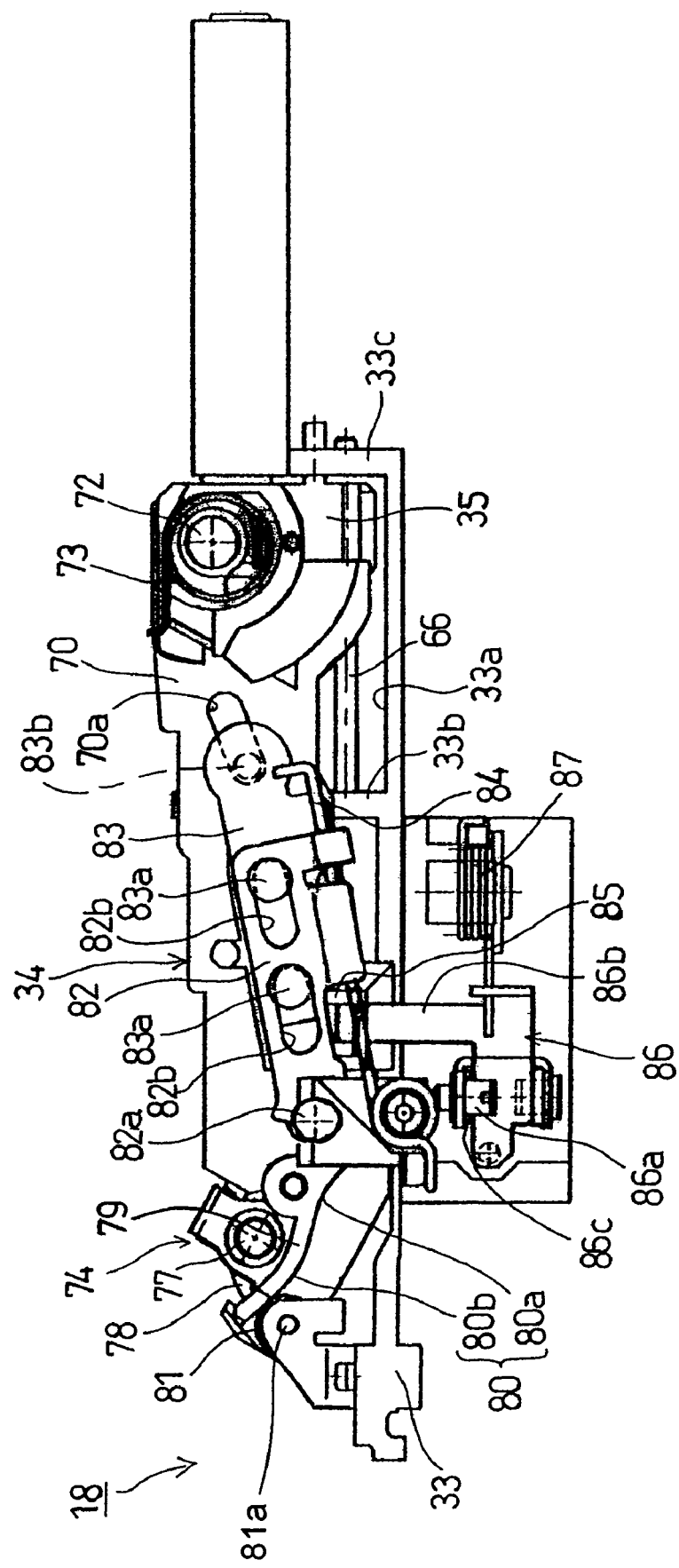
FIG. 20 is a side elevational view of elements of the camera body of the digital camera shown in FIGS. 1 and 2 in the retracted state of the pop-up flash.

The flash unit 34 and the body frame 33 are connected to each other by a linkage mechanism (extendable linkage mechanism). This linkage mechanism is provided with a first linking member (an element of a projection-position determining device; an element of the linkage mechanism) 82 and a second linking member (an element of the projection-position determining device; an element of the linkage mechanism) 83. The first linking member 82 is pivoted at its one end about a pivot pin 82*a* fixed to the body frame 33, while the second linking member 83 is movable relative to the first linking member 82 in a lengthwise direction thereof. The first linking member 82 is provided with a pair of slots 82*b* which are elongated in a lengthwise direction of the first linking member 82. The second linking member 83 is provided with a pair of slidable projections 83*a* which project leftward of the camera body 11 to be slidably engaged in the pair of slots 82*b* of the first linking member 82, respectively. The pair of slots 82*b* and the pair of slidable projections 83*a* constitute a movement-range determining device. The second linking member 83 is further provided in the vicinity of the other end thereof with a slidable pin 83*b* which projects in the direction opposite to the direction of projection of the pair of projections 83*a*. The slidable pin 83*b* is slidably engaged in a slot 70*a* which is formed on the support arm 70 to be elongated in a substantially lengthwise direction thereof. The linkage mechanism that is composed of the first linking member 82 and the second linkage member 83 are adopted to determine the fully-lifted position of the flash unit 34 with respect to the body frame 33. Accordingly, due to the slidable engagement of the pair of projections 83*a* with the pair of slots 82*b*, the length of the linkage mechanism (the distance between the pivot pin 82*a* and the slidable pin 83*b*) is variable, and the flash unit 34 is prevented from rotating in a projecting direction (clockwise as viewed in FIGS. 20 and 21) beyond the fully-lifted position (the position shown in FIG. 21) from a state where the linkage mechanism is included relative to the body frame 33 as shown in FIG. 21, so that the length of the linkage mechanism reaches its maximum. The first linking member 82 and the second linking member 83 are biased to rotate in a direction to lift the flash unit 34 (counterclockwise as viewed in FIGS. 20 and 21 about the pivot pin 82*a*) by a torsion spring (linkage-mechanism biasing device/an element of the flash-unit biasing device) 84. One end of the torsion spring 84 is engaged with the body frame 33 while the other end of the torsion spring 84 is engaged with the first linking member 82.

The support arm 70 is provided with a locking hole (an element of a locking mechanism) 85. The locking hole 85 is a rectangular through-hole which is opened to the side of the support arm 70, and is formed on the support arm 70 at a position thereon in the vicinity of the light emitting portion 74 in the lengthwise direction of the support arm 70. As shown in FIG. 20, the locking hole 85 is positioned in front of the pivot shaft 72 when the flash unit 34 is in the retracted state. The body frame 33 is provided with a catching member (an element of the locking mechanism) 86 which is engaged with the locking hole 85 when the flash unit 34 is in the retracted state. The catching member 86 is rotatable about a pivot 86*a*, the axis of which extends in the vertical direction of the digital camera 10, i.e., in a direction orthogonal to the pivot shaft 72. The catching member 86 is provided with an engaging arm 86*b* which is engaged and disengaged in and from the locking hole 85 when the catching member 86 rotates forward and reverse, respectively. The engaging arm 86*b* extends upwards in a direction substantially parallel to the axis of the pivot 86*a*, and an upper end portion of the engaging arm 86*b* is bent in a direction going into the page of FIG. 20 or 21 at substantially right angles to be formed in an L-shape (i.e., in a direction parallel to the pivot shaft 72). In a state where this L-shaped upper end portion of the engaging arm 86*b* is engaged in the locking hole 85, the flash unit 34 is prevented from rotating in the projecting direction due to the engagement of the L-shaped upper end portion of the engaging arm 86*b* with an inner surface 85*a* (see FIG. 21) in the locking hole 85 of the support arm 70, and is further prevented from moving forward due to the engagement of the L-shaped upper end portion of the engaging arm 86*b* with another inner surface 85*b* (see FIG. 21) in the locking hole 85 of the support arm 70. Namely, in a state where the L-shaped upper end portion of the engaging arm 86*b* is engaged in the locking hole 85, the light emitting portion 74 is prevented from rotating toward the fully-lifted position and moving forward together with the slidable member 35. The body frame 33 is provided with a torsion spring (biasing device) 87 which biases the catching member 86 toward a point at which the catching member 86 is engaged in the locking hole 85. The camera body 11 is provided with a flash pop-up button 88 (see FIG. 17) which is exposed to the outside of the camera body 11 from an outer surface thereof. Pushing the flash pop-up button 88 causes the catching member 86 to rotate in a direction (a direction out of the page of FIG. 20 or 21) to disengage the catching member 86 from the locking hole 85 against the spring force of the torsion spring 87.

The position of the catching member 86 in the axial direction of the pivot 86*a* can be adjusted via selection of (the size of) a washer 86*c* (see FIGS. 20 and 21) installed between the body frame 33 and the catching member 86. By adjusting the position of the catching member 86, the flash unit 34 can be reliably positioned in the fully-retracted position by changing the height of the L-shaped upper end portion of the engaging arm 86*b* relative to the body frame 33. Although the washer 86*c* is installed on the upper side of the pivot 86*a* in the illustrated embodiment of the digital camera shown in FIGS. 20 and 21, the washer 86*c* can be installed on the lower side of the pivot 86*a*.

Operations of the pop-up flash 18 having the above described structure will be discussed hereinafter. FIGS. 19 and 20 show a fully retracted state of the pop-up flash 18. In this state, the lengthwise direction of the pair of support arms 70 and 71 are substantially parallel to the axial direction of the slidable-member guide shaft 65 and the sub-guide shaft 66, while the flash unit 34 is fully accommodated in the flash accommodation portion 33*a* of the body frame 33. Furthermore, the flash unit 34 is positioned so that the flash lens 76 faces toward a bottom surface of the flash accommodation portion 33*a*, and portions of the convex surfaces 80*b* of the pair of roller guide surfaces 80 in the vicinity of edges of the convex surfaces 80*b* (upper edges of the pair of roller guide surfaces 80 as viewed in FIG. 21) are in contact with the pair of guide rollers 81, respectively (see FIG. 20). Additionally, in the retracted state of the pop-up flash 18, the length of the linkage mechanism, which is composed of the first linking member 82 and the second linking member 83, is maximum while the slidable pin 83*b* is in contact with one of opposite ends in the slot 70*a* of the support arm 70 which is farther from the pivot shaft 72. Although the flash unit 34 is biased toward the fully-lifted position by the torsion springs 73 and 84 in the state shown in FIG. 20, the flash unit 34 is prevented from rotating in the projecting direction due to the engagement of the catching member 86 with the locking hole 85.

As shown in FIG. 19, in the retracted state of the pop-up flash 18, the slidable member 35 is positioned in the vicinity of the rearward moving limit thereof (retreated position relative to the body frame 33) that is determined by the first rear wall 33c of the body frame 33. Although the slidable member 35 is biased forward by the spring force of the compression coil spring 67, the slidable member 35 remains in the position shown in FIG. 20 against the spring force of the compression coil spring 67 because the flash unit 34, which is connected to the slidable member 35 via the pivot shaft 72, is prevented from moving forward by the engagement of the catching member 86 with the locking hole 85.

If the catching member 86 is disengaged from the locking hole 85 by pushing the flash pop-up button 88, the flash unit 34 is allowed to rotate in the projecting direction while the slidable member 35 is allowed to move forward, and therefore the flash unit 34 pops up to be positioned in the fully-lifted position by the spring force of the springs 72 and 84 as shown in FIG. 21. At the same time, the slidable member 35 is moved to the forward moving limit thereof (the advanced position), so that the slidable member 35 is in contact with the front wall 33b of the body frame 33, by the spring force of the compression coil spring 67. Concurrent with the movement of the slidable member, the flash unit 34 commences to rotate in a direction to move the light emitting portion 74 upwards about the pivotal shaft 72 while moving forward together with the slidable member 35. In the linkage mechanism that supports the flash unit 34, simultaneously occurring with the movement of the flash unit, the slidable pin 83b approaches the other end of the slot 70a (one end of the slot 70a which is closer to the pivot shaft 72) while reducing the distance between the opposite ends of the linkage mechanism (the distance between the pivot pin 82a and the slidable pin 83b) by sliding the pair of projections 83a of the second linking member 83 on the first linking member 82 in the pair of slots 82b thereof, respectively, until the flash unit 34 rotates to the halfway in the projecting direction. Further rotation of the flash unit 34 beyond halfway in the projecting direction causes the slidable pin 83b to approach one end of the slot 70a which is farther from the pivot shaft 72 while increasing the distance between the opposite ends of the linkage mechanism (the distance between the pivot pin 82a and the slidable pin 83b) by sliding the pair of projections 83a of the second linking member 83 on the first linking member 82 in the pair of slots 82b thereof, respectively. Further rotation of the flash unit 34 to the position shown in FIG. 21 makes the length of the linkage mechanism maximum to thereby prevent the flash unit 34 from further rotating beyond the fully-lifted position shown in FIG. 21.

As described above, by moving the light emitting portion 74 forward together with the slidable member 35 while the flash unit 34 pops up, the light emitting portion 74 is positioned closer to the object which is to be photographed, i.e., closer than a position of a light emitting portion of a conventional pop-up flash which simply rotates about a pivot at a fixed position. Accordingly, with the pop-up flash 18, flashlight emitted from the light emitting portion 74 is prevented from being intercepted by any part of the digital camera 10 to thereby prevent vignetting from occurring in flash photography.

When the pop-up flash 18 is retracted into the camera body 11 from the fully-lifted position, operations reverse to the above described operations are performed. Namely, the flash unit 34 rotates in a retracting direction (counterclockwise as viewed in FIGS. 20 and 21) while moving rearward together with the slidable member 35 when the pop-up flash 18 is retracted into the camera body 11. This retracting movement of the flash unit 34 is performed manually though the above described pop-up movement of the flash unit 34 is performed automatically by spring force, and accordingly consideration is given specifically to the manual retracting operation of the pop-up flash 18 which includes two movements in different directions: a rotation of the flash unit 34 in the retracting direction and a rearward movement of the flash unit 34. Depressing the flash unit 34 toward the retracted position thereof (counterclockwise as viewed in FIG. 21) in the state shown in FIG. 21 causes the concave surfaces 80a of the pair of roller guide surfaces 80 to come into contact with the pair of guide rollers 81 as shown in FIG. 22, respectively, shortly before the pair of support arms 70 and 71 become horizontal (shortly before the pair of support arms 70 and 71 are positioned so as to be angled relative to the body frame 33). More specifically, portions of the concave surfaces 80a of the pair of roller guide surfaces 80 in the vicinity of edges of the concave surfaces 80a on the side opposite from the convex surfaces 80b (lower edges of the pair of roller guide surfaces 80 as viewed in FIG. 21) come into contact with the pair of guide rollers 81, respectively. Due to the relationship between the contacting angle of the concave surfaces 80a of the pair of roller guide surfaces 80 relative to the pair of guide rollers 81 (the angle of the flash unit 34 about the pivot shaft 72) and the shapes (radius of curvature/angle of inclination) of the concave surfaces 80a in the range of contact of the concave surfaces 80a with the guide rollers 81, a component force acting on the flash unit 34 to move the flash unit 34 rearwards occurs if the flash unit 34 is pressed downwards in the state shown in FIG. 22. This component force that assists the flash unit 34 in moving rearwards makes it possible to change the operating condition of the flash unit 34 smoothly from an operating condition where the flash unit 34 rotates in the retracting direction to a different operating condition where the flash unit 34 rotates in the retracting direction while moving rearwards. Namely, it is possible to make the user perceive these two different operating conditions as if they were a continuous operating condition for retracting the flash unit 34 without making the user become aware of the two-stepwise retracting operation of the flash unit 34 in which the flash unit 34 is closed in a first step and slid rearwards in a second step, which improves the operability of the pop-up flash 18. Specifically, the aforementioned component force, which acts on the flash unit 34 to move the flash unit 34 rearwards, occurs in an efficient manner since the contact points between the pair of roller guide surfaces 80 and the pair of guide rollers 81 are set in the vicinity of the front end of the flash unit 34 that is the farthest point on the flash unit 34 from the pivot shaft 72. Moreover, the flash unit 34 can be operated even more smoothly since portions on the body frame 33 which are to be in contact with the pair of roller guide surfaces 80 when the flash unit 34 is retracted are provided as the pair of guide rollers 81.

A further rotation of the flash unit 34 in the retracting direction in the state shown in FIG. 22 causes the contact points of the pair of roller guide surfaces 80 with the pair of guide rollers 81 to move from the concave surfaces 80a to the convex surfaces 80b. The convex surfaces 80b come in contact at their crests with the pair of guide rollers 81, respectively, immediately before the flash unit 34 reaches the retracted position shown in FIG. 20, and thereafter the flash unit 34 can be moved securely to the retracted position by a light pressing force in the final stage of the retracting movement of the flash unit 34 because a portion of each convex surface 80b from the crest thereof to the edge of the convex surface 80b (upper edge as viewed in FIG. 21) is inclined to guide the flash unit 34 downwards (in a direction approaching the body frame 33) via the engagement of the convex surfaces 80b of the pair of roller guide surfaces 80 with the pair of guide rollers 81. In addition, when a force is given to the flash unit 34 so that it moves forward in the retracted state of the flash unit 34, it can be seen from FIG. 20 that the inclination of the aforementioned portion of each convex surface 80b from the crest thereof to the edge of the convex surface 80b assists the flash unit 34 in moving upwards (in the opposite direction away from the body frame 33), and accordingly a combination of the pair of roller guide surfaces 80 and the pair of guide rollers 81 also serves as a mechanism for assisting the flash unit 34 in projecting from the camera body 11 when the pop-up flash 18 pops up.

As can be understood from the above descriptions, in the pop-up flash 18 that is incorporated in the present embodiment of the digital camera, flashlight is not intercepted by any part of the camera when the pop-up flash 18 is in the popped-up position, so that vignetting caused by the interception of flashlight by a part of the camera is prevented from occurring in flash photography. Consequently, a satisfactory optical performance of the pop-up flash 18 is achieved. Moreover, good operability of the pop-up flash 18 when retracted is also achieved.

Figure 23:
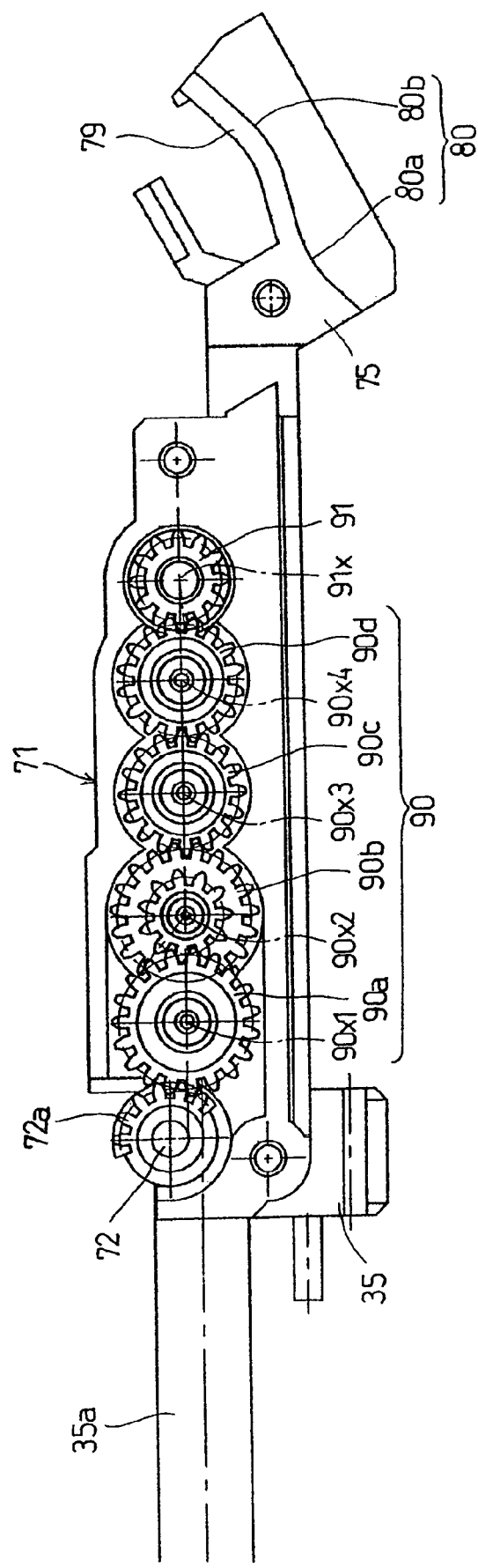
FIG. 23 is a side elevational view of the pop-up flash, showing a speed-change mechanism thereof.

The pop-up flash 18 is further provided with a speed-change gear mechanism for adjusting the rotational speed of the flash unit 34 about the pivot shaft 72 when the flash unit 34 pops up immediately after the flash pop-up button 88 is operated. As shown in FIGS. 18, 23 and 24, the pivot shaft 72 is provided, at one end thereof which projects rightwards (with respect to the camera body) from the right support arm 71, with an on-axis gear 72a. The on-axis gear 72a is engaged with a first gear 90a of a reduction gear train 90 installed on a side surface of the support arm 71. The reduction gear train 90 consists of four gears: the first gear 90a, a second gear 90b, a third gear 90c and a fourth gear 90d. The fourth gear 90d, which serves as a final gear of the reduction gear train 90, is engaged with a cam-incorporated gear (rotary driven member) 91. Rotational shafts 90x1, 90x2, 90x3 and 90x4 of the first through fourth gears 90a through 90d of the reduction gear train 90 and a rotational shaft 91x of the cam-incorporated gear 91 are parallel to the axis of the pivot shaft 72, and positioned on a straight line at predetermined intervals in a lengthwise direction of the support arm 71. The rotational shaft 91x of the cam gear 91 is provided, on an extension portion of the rotational shaft 91x between the pair of support arms 70 and 71, with a cam 92 (see FIGS. 17, 18 and 24) having a substantially triangle cross section. The flash unit 34 is provided with a leaf spring (auxiliary biasing member) 93 which is positioned so that a free end 93a thereof faces an outer peripheral surface (cam surface) of the cam 92. The leaf spring 93 is formed in an S-shape, and the other end (fixed end) 93 thereof is fixed to the support arm 71.

Since the pivot shaft 72 that includes the on-axis gear 72a is supported by the slidable member 35 as described above, a rotation of the flash unit 34 relative to the slidable member 35 causes the first gear 90a to rotate due to the engagement of the on-axis gear 72a with the first gear 90a. This rotation of the first gear 90a is transferred to the cam gear 91 via the second, third and fourth gears 90b, 90c and 90d to rotate the cam gear 91. This rotation of the cam gear 91 causes the cam 92, that is positioned coaxially with the cam gear 91, to rotate to thereby change orientation of the cam 92 relative to the leaf spring 93. FIG. 24A shows the flash unit 34 in the retracted state, in which the free end 93a of the leaf spring 93 is in surface contact with a first flat peripheral surface 92a of the triangle cam 92. If the flash unit 34 rotates in the projecting direction from the retracted position shown in FIG. 24A, each of the cam gear 91 and the cam 92 rotates counterclockwise in FIG. 24 via each gear of the reduction gear train 90. This counter-clockwise rotation of the cam 92 causes an apex 92b of the cam 92 that is adjacent to the first flat outer surface 92a to come into contact with the free end 93a of the leaf spring 93. The distance between the axis of the rotational shaft 91x and the apex 92b is greater than the distance between the axis of the rotational shaft 91x and the first flat outer surface 92a on a straight line which is orthogonal to the first flat outer surface 92a and passes through the axis of the rotational shaft 91x, and therefore the apex 92b of the cam 92 pushes the free end 93a of the leaf spring 93 radially outwards in a direction away from the axis of the rotational shaft 91x to elastically deform the leaf spring 93. At this time, the resiliency of the leaf spring 93 against the cam 92 reduces the rotational speed of the cam gear 91, and this reduction of the rotational speed of the cam gear 91 reduces the rotational speed of the first gear 90a via the fourth gear 90d, the third gear 90c and the second gear 90b, thus reducing the rotational speed of the flash unit 34 about the pivot shaft 72. FIG. 24B shows the flash unit 34 at an intermediate angular position between the retracted position and the fully-lifted position. In this state shown in FIG. 24B, the amount of force applied to the free end 93a by the cam 92 (the apex 92b) is maximum, and accordingly, the resiliency of the leaf spring 93 against the cam 92 is maximum.

A further rotation of the flash unit 34 in the jutting direction beyond the middle angular position shown in FIG. 24B causes the apex 92b to move gradually away from the free end 93a of the leaf spring 93, and at the same time causes the leaf spring 93, which is elastically deformed to the maximum degree in a state shown in FIG. 24B, to return to the original shape of the leaf spring 93 in a direction to make the free end 93a approach the axis of the rotational shaft 91x. This resiliency of the leaf spring 93 acts on the cam 92 as an auxiliary force for increasing the torque of the cam gear 91. Accordingly, the leaf spring 93 operates to cancel the capability of the reduction gear train 90 so as to reduce the rotational speed of the cam gear 91, and conversely, assists the flash unit 34 to pop up. The leaf spring 93 continues to assist the flash unit 34 to pop up until shortly before the flash unit 34 reaches the fully-lifted position. FIG. 24C shows the flash unit 34 in the fully-lifted position. In this state shown in FIG. 24C, a second flat peripheral surface 92c of the triangle cam 92 that is adjacent to the apex 92b faces the free end 93a of the leaf spring 93 with a slight gap between the second flat peripheral surface 92c and the free end 93a of the leaf spring 93. Therefore, in the fully-lifted state of the flash unit 34 shown in FIG. 24C, the leaf spring 93 has returned to its original shape, so that no spring force is given to the cam gear 91 by the leaf spring 93.

As can be understood from the above descriptions, the pop-up flash 18 that is incorporated in the present embodiment of the digital camera is provided with the above described speed-change gear mechanism, which reduces the rotational speed of the flash unit 34 about the pivot shaft 72 in an initial stage of pop-up movement of the flash unit 34, and subsequently stops reducing the same rotational speed to give the flash unit 34 an auxiliary force for lifting the flash unit 34 toward the fully-lifted position once the flash unit 34 comes close to the fully-lifted position. Each of the torsion springs 73 and 84 is elastically deformed to the maximum degree (the amount of resiliency is maximum) when the flash unit 34 is in the retracted state, and the resiliency of each spring 73 and 84 gradually reduces as the flash unit 34 approaches the fully-lifted position. In typical pop-up flashes in which a pop-up flash portion (light emitting portion) is held in a fully-lifted position thereof by spring force, there has been a demand for securely applying a force which makes the flash unit 34 move in the projecting direction uniformly until the flash unit 34 reaches the fully-lifted position. To satisfy this demand, the above described speed-change gear mechanism operates effectively. The above described speed-change gear mechanism operates to exert a force to the flash unit 34 in a direction to reduce the rotational speed of the flash unit 34 in the range of rotational movement of the flash unit 34 in the vicinity of the retracted position thereof, in which the biasing force for lifting the flash unit 34 by the torsion springs 73 and 84 is maximum, and further operates to assist the flash unit 34 in popping up in another range of rotational movement of the flash unit 34 in the vicinity of the fully-lifted position thereof in which the biasing force for lifting the flash unit 34 by the torsion spring 73 is small. This capability of the speed-change gear mechanism makes it possible for the flash unit 34 to rise all the way to the fully-lifted position securely and smoothly when the pop-up flash 18 pops up.

Although the flash unit 34 is provided with only one leaf spring 93 in the above illustrated embodiment of the digital camera, the flash unit 34 can be provided with more than one leaf spring 93. The degree of effectiveness of the speed-change gear mechanism can be adjusted by changing the number of leaf springs corresponding to the leaf spring 93.

Obvious changes may be made in the specific embodiment of the present invention described herein, such modifications being within the spirit and scope of the invention claimed. It is indicated that all matter contained herein is illustrative and does not limit the scope of the present invention. For instance, although the present embodiment of the pop-up flash is incorporated in the camera body 11 to which each of the grip 40 and the LCD monitor panel 25 is rotatably mounted in the above illustrated embodiment of the digital camera, the present embodiment of the pop-up flash can be applied to any other type of camera not equipped with a grip or LCD monitor panel corresponding to the grip 40 or the LCD monitor panel 25, respectively. Moreover, the present embodiment of the pop-up flash can be applied to not only a digital camera such as the above described digital camera 10, but also a camera using silver-salt film.

Although the pop-up flash 18 is movable with the slidable member 35 in a direction toward and away from the object to be photographed in the above illustrated embodiment of the digital camera, the present invention can also be applied to another type of pop-up flash which simply pops up or is retracted at a fixed position, i.e., without moving in a direction toward and away from the object to be photographed. Although the pop-up flash 18 moves between the retracted position and the fully-lifted position by rotating the light emitting portion 74 about the pivot shaft 72 in the above illustrated embodiment of the digital camera, the present invention can be applied not only to a type of pop-up flash (such as the above described pop-up flash 18) which moves between the retracted position and the fully-lifted position by rotating the light emitting portion 74, but also to another type of pop-up flash which moves between the retracted position and the fully-lifted position by moving the light emitting portion 74 in a different manner, e.g., by linearly moving the light emitting portion 74.

What is claimed is:

1. A pop-up flash of a camera, comprising:
    a flash unit movable between a retracted position, in which said flash unit is accommodated in a camera body, and a fully-lifted position, in which said flash unit projects from said camera body;
    a biasing device which biases said flash unit toward said fully-lifted position; and
    a speed-change mechanism for reducing a speed of movement of said flash unit, which is driven by the biasing force of said biasing device, by applying a variable load to counter the biasing force of said biasing device during a first range of movement of said flash unit in a projecting direction from said retracted position to said fully-lifted position, wherein said variable load reaches a maximum at an intermediate position of said flash unit, between the retracted position and the fully lifted position.

2. The pop-up flash according to claim 1, wherein said speed-change mechanism reduces said movement speed of said flash unit in the first range of movement of said flash unit from said retracted position to an intermediate position toward said fully-lifted position, and stops reducing said movement speed of said flash unit in a second range of movement of said flash unit from said intermediate position toward said fully-lifted position.

3. The pop-up flash according to claim 2, wherein said speed-change mechanism comprises:
    an auxiliary biasing member which is resiliently bent when said speed-change mechanism reduces said movement speed of said flash unit, and is released from being resiliently bent when said speed-change mechanism stops reducing said movement speed of said flash unit to give said flash unit an auxiliary biasing force which assists said flash unit in moving toward said fully-lifted position.

4. The pop-up flash according to claim 1, wherein said flash unit is pivoted about a pivot to be rotatable relative to said camera body between said retracted position and said fully-lifted position, and
    wherein said speed-change mechanism comprises:
    a leaf spring one end of which is fixed to said flash unit so that another end of said leaf spring serves as a free end; and
    a rotary driven member supported by said flash unit to be rotatable on a rotational axis which is parallel to said pivot and driven to rotate forward and reverse by forward and reverse rotations of said flash unit, respectively,
    wherein said rotary driven member includes a noncircular portion having a noncircular cross section which is formed on said rotary driven member to be capable of coming in contact with said free end of said leaf spring, and
    wherein said speed-change mechanism changes said movement speed of said flash unit by variations of a state of contact of said leaf spring with said noncircular portion which are caused by a rotation of said rotary driven member.

5. The pop-up flash according to claim 4, wherein said rotary driven member comprises a cam-incorporated gear which is positioned on said rotational axis of said rotary drive member and which includes a gear and a cam having said noncircular cross section.

6. The pop-up flash according to claim 5, wherein said speed-change mechanism comprises:
    an on-axis gear which rotates in accordance with rotation of said flash unit, a rotational axis of said on-axis gear being coincident with an axis of said pivot of said flash unit; and
    a reduction gear train provided between said on-axis gear and said cam-incorporated gear.

7. The pop-up flash according to claim 6, wherein said flash unit comprises:

a support arm, one end of which is pivoted on said camera body about said pivot; and a light emitting portion fixed to another end of said support arm, wherein said reduction gear train is provided on said support arm along a lengthwise direction thereof.

8. The pop-up flash according to claim 7, wherein said support arm comprises a pair of support arms which are parallel to each other, said reduction gear train being provided on one of said pair of support arms along a lengthwise direction thereof.

9. The pop-up flash according to claim 7, wherein said light emitting portion comprises a flashtube and a lens element provided in front of said flash tube.

10. The pop-up flash according to claim 4, wherein said leaf spring comprises at least two leaf springs.

11. The pop-up flash according to claim 4, wherein said biasing device comprises a torsion spring positioned around said pivot of said flash unit.

12. The pop-up flash according to claim 4, wherein said noncircular cross section of said noncircular portion is a substantially triangular cross section.

13. The pop-up flash according to claim 4, wherein said leaf spring is disengaged from said noncircular portion of said rotary driven member when said flash unit is in said fully-lifted position.

14. The pop-up flash according to claim 5, wherein said leaf spring is formed in a substantially S-shape.

15. The pop-up flash according to claim 1, further comprising a locking mechanism for holding said flash unit in said retracted position against a biasing force of said biasing device.

16. The pop-up flash according to claim 15, wherein said locking mechanism comprises:

a locking hole formed on one of said flash unit and said camera body; and a catching member fixed to the other of said flash unit and said camera body to be engageable in said locking hole.

17. The pop-up flash according to claim 1, further comprising a fully-lifted position determining device, positioned between said camera body and said flash unit, for determining a limit of movement of said flash unit in a direction toward said fully-lifted position relative to said camera body.

18. The pop-up flash according to claim 17, wherein said fully-lifted position determining device comprises an extendable linkage mechanism, one end of said extendable linkage mechanism being pivoted on said camera body, and another end of said extendable linkage mechanism being connected to said flash unit.

19. A pop-up flash of a camera, comprising:

a retractable flash unit, one end of which is pivoted on a camera body, a light emitting portion being fixed to another end of said flash unit;

a biasing device which biases said retractable flash unit to rotate in a direction to make said retractable flash unit project from said camera body; and a speed-change mechanism for reducing a speed of rotation of said flash unit by applying a variable load to counter the bias of said biasing device during a range of movement while said retractable flash unit rotates in said direction to make said retractable flash unit project from said camera body, wherein said variable load reaches a maximum at an intermediate position of said flash unit, between a retracted position and a fully lifted position of the flash unit.

* * * * *